(12) United States Patent
Tokita et al.

(10) Patent No.: US 8,922,863 B2
(45) Date of Patent: Dec. 30, 2014

(54) OPTICAL SCANNING DEVICE AND IMAGE FORMING APPARATUS

(75) Inventors: Toshiaki Tokita, Kanagawa (JP); Nobuaki Kubo, Tokyo (JP); Naoto Watanabe, Kanagawa (JP); Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 313 days.

(21) Appl. No.: 13/608,216

(22) Filed: Sep. 10, 2012

(65) Prior Publication Data

US 2013/0070323 A1   Mar. 21, 2013

(30) Foreign Application Priority Data

Sep. 21, 2011   (JP) .................. 2011-205668

(51) Int. Cl.
| | | |
|---|---|---|
| G02B 26/08 | (2006.01) | |
| B41J 2/47 | (2006.01) | |
| G03G 15/043 | (2006.01) | |
| G02B 26/12 | (2006.01) | |
| G02B 3/00 | (2006.01) | |
| G02B 5/30 | (2006.01) | |

(52) U.S. Cl.
CPC ............ B41J 2/473 (2013.01); G03G 15/0435 (2013.01); G02B 26/123 (2013.01); G02B 3/0075 (2013.01); G02B 5/3058 (2013.01)
USPC ........................................ 359/204.3; 347/243

(58) Field of Classification Search
CPC .. G02B 26/123; G02B 3/0075; G02B 5/3058; G02B 27/286; B41J 2/473; G03G 15/0435
USPC ........ 359/204.3; 347/233, 243–244, 258–261
See application file for complete search history.

(56) References Cited

U.S. PATENT DOCUMENTS

| | | |
|---|---|---|
| 5,831,758 A | 11/1998 | Sakai et al. |
| 5,999,345 A | 12/1999 | Nakajima et al. |

(Continued)

FOREIGN PATENT DOCUMENTS

| | | |
|---|---|---|
| JP | 60-032019 | 2/1985 |
| JP | 7-144434 | 6/1995 |
| JP | 2010-160295 | 7/2010 |

OTHER PUBLICATIONS

Determination of the physical properties of an arbitrary twisted-nematic liquid crystal cell (Colin Soutar, et al., Optical Engineering 33(8), Aug. 1994, pp. 2704-2712).

*Primary Examiner* — James Phan
(74) *Attorney, Agent, or Firm* — Oblon, Spivak, McClelland, Maier & Neustadt, L.L.P.

(57) ABSTRACT

An optical scanning device separately scanning plural scan target surfaces in a first direction with light includes: a light source unit configured to emit first and second light beams mutually different in polarization state; an optical deflector configured to rotate around an axis parallel to a second direction perpendicular to the first direction, and deflect the emitted light beams; an imaging optical element provided on respective optical paths of the deflected light beams; a polarization adjustment element provided on the optical paths of the light beams transmitted through the imaging optical element, and configured to correct respective changes in polarization state of the light beams occurring during the transmission of the light beams through the imaging optical element; and a polarization separation element provided on the optical paths of the light beams emitted from the polarization adjustment element, and configured to separate the light beams from each other.

10 Claims, 26 Drawing Sheets

(56) References Cited

U.S. PATENT DOCUMENTS

| | | | |
|---|---|---|---|
| 6,166,842 A | 12/2000 | Aoki et al. | |
| 6,256,133 B1 | 7/2001 | Suzuki et al. | |
| 6,347,004 B1 | 2/2002 | Suzuki et al. | |
| 6,366,384 B1 | 4/2002 | Aoki et al. | |
| 6,376,837 B1 | 4/2002 | Itabashi et al. | |
| 6,388,792 B1 | 5/2002 | Atsuumi et al. | |
| 6,448,998 B1 | 9/2002 | Suzuki et al. | |
| 6,509,995 B1 | 1/2003 | Suzuki et al. | |
| 6,596,985 B2 | 7/2003 | Sakai et al. | |
| 7,098,938 B2 * | 8/2006 | Yoshida | 347/244 |
| 7,215,354 B1 | 5/2007 | Sakai et al. | |
| 7,956,884 B2 * | 6/2011 | Ichii | 347/241 |
| 2002/0080428 A1 | 6/2002 | Suzuki et al. | |
| 2003/0107788 A1 | 6/2003 | Hayashi et al. | |
| 2003/0128413 A1 | 7/2003 | Suzuki et al. | |
| 2003/0179429 A1 | 9/2003 | Takanashi et al. | |
| 2003/0214694 A1 | 11/2003 | Sakai | |
| 2003/0218788 A1 | 11/2003 | Sakai et al. | |
| 2004/0090520 A1 | 5/2004 | Sakai et al. | |
| 2004/0125193 A1 | 7/2004 | Kubo | |
| 2004/0184127 A1 | 9/2004 | Nakajima et al. | |
| 2004/0196507 A1 | 10/2004 | Sakai | |
| 2004/0263968 A1 | 12/2004 | Kobayashi et al. | |
| 2006/0077500 A1 | 4/2006 | Hayashi et al. | |
| 2006/0187294 A1 | 8/2006 | Saisho et al. | |
| 2007/0091398 A1 | 4/2007 | Ueda et al. | |
| 2007/0211324 A1 | 9/2007 | Sakai et al. | |
| 2007/0211326 A1 | 9/2007 | Saisho et al. | |
| 2007/0216316 A1 | 9/2007 | Hirano et al. | |
| 2007/0253048 A1 | 11/2007 | Sakai et al. | |
| 2008/0025759 A1 | 1/2008 | Ichii et al. | |
| 2008/0055672 A1 | 3/2008 | Watanabe et al. | |
| 2008/0055692 A1 | 3/2008 | Saisho et al. | |
| 2008/0068689 A1 | 3/2008 | Saisho et al. | |
| 2008/0068693 A1 | 3/2008 | Hayashi et al. | |
| 2008/0100895 A1 | 5/2008 | Hayashi et al. | |
| 2008/0123159 A1 | 5/2008 | Hayashi et al. | |
| 2008/0192319 A1 | 8/2008 | Miyatake et al. | |
| 2008/0204840 A1 | 8/2008 | Watanabe et al. | |
| 2008/0218827 A1 | 9/2008 | Watanabe et al. | |
| 2008/0219601 A1 | 9/2008 | Arai et al. | |
| 2008/0285104 A1 | 11/2008 | Arai et al. | |
| 2009/0052944 A1 | 2/2009 | Kubo et al. | |
| 2009/0059333 A1 | 3/2009 | Sakai | |
| 2009/0060583 A1 | 3/2009 | Amada et al. | |
| 2009/0065685 A1 | 3/2009 | Watanabe et al. | |
| 2009/0080907 A1 | 3/2009 | Hagiya et al. | |
| 2009/0195636 A1 | 8/2009 | Arai et al. | |
| 2009/0220256 A1 | 9/2009 | Suhara et al. | |
| 2009/0231557 A1 | 9/2009 | Kubo | |
| 2009/0314927 A1 | 12/2009 | Tatsuno et al. | |
| 2010/0060710 A1 | 3/2010 | Kubo | |
| 2010/0060963 A1 | 3/2010 | Miyake et al. | |
| 2010/0091083 A1 | 4/2010 | Itami et al. | |
| 2010/0118366 A1 | 5/2010 | Tokita et al. | |
| 2010/0183337 A1 | 7/2010 | Kubo et al. | |
| 2010/0194843 A1 | 8/2010 | Sakai et al. | |
| 2010/0328417 A1 | 12/2010 | Saisho et al. | |
| 2011/0002025 A1 | 1/2011 | Tokita et al. | |
| 2011/0063594 A1 | 3/2011 | Sakai | |
| 2011/0090549 A1 | 4/2011 | Sakai | |
| 2011/0216386 A1 | 9/2011 | Watanabe et al. | |
| 2011/0235132 A1 | 9/2011 | Saisho et al. | |
| 2011/0316959 A1 | 12/2011 | Saisho et al. | |
| 2011/0318057 A1 | 12/2011 | Watanabe | |
| 2012/0050444 A1 | 3/2012 | Sakai | |
| 2012/0177409 A1 | 7/2012 | Arai et al. | |

* cited by examiner

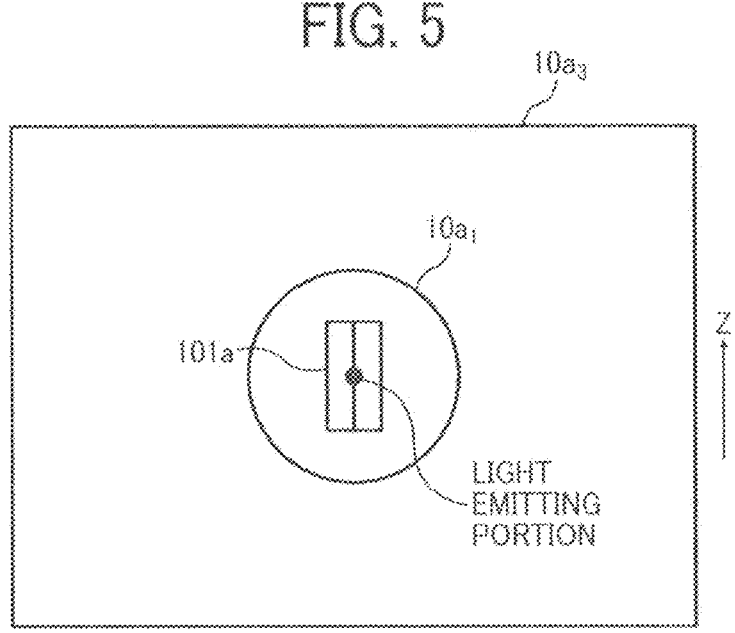
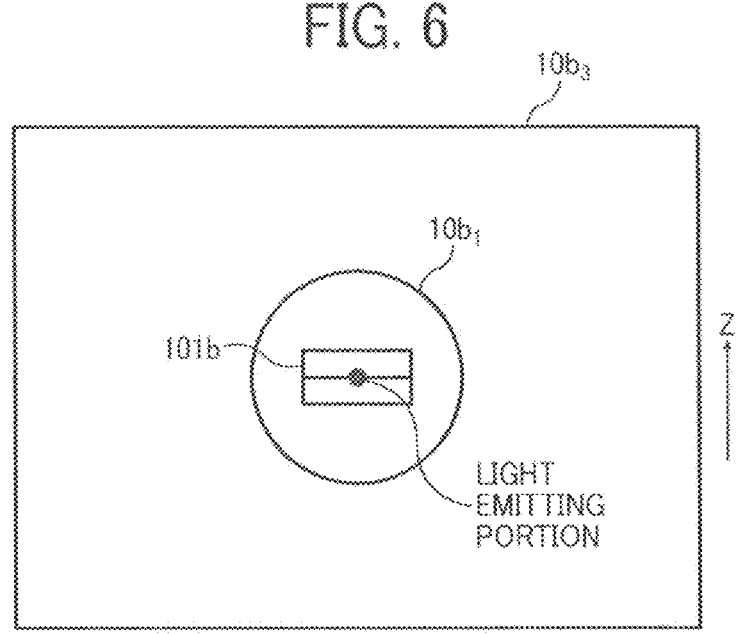

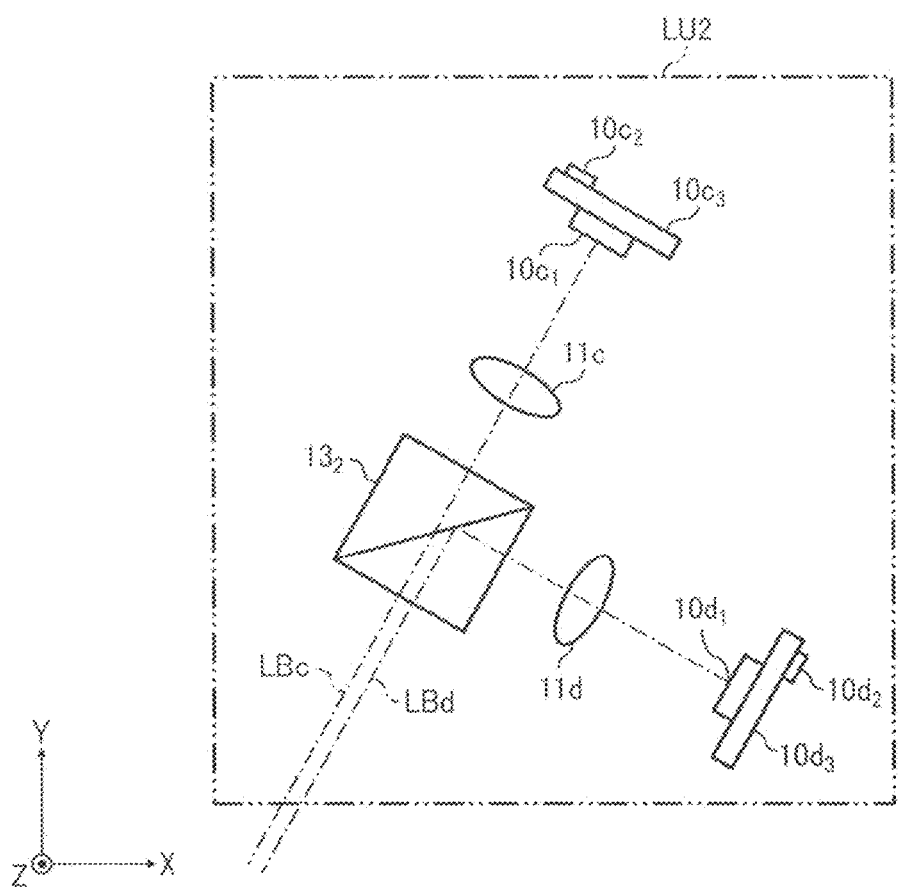

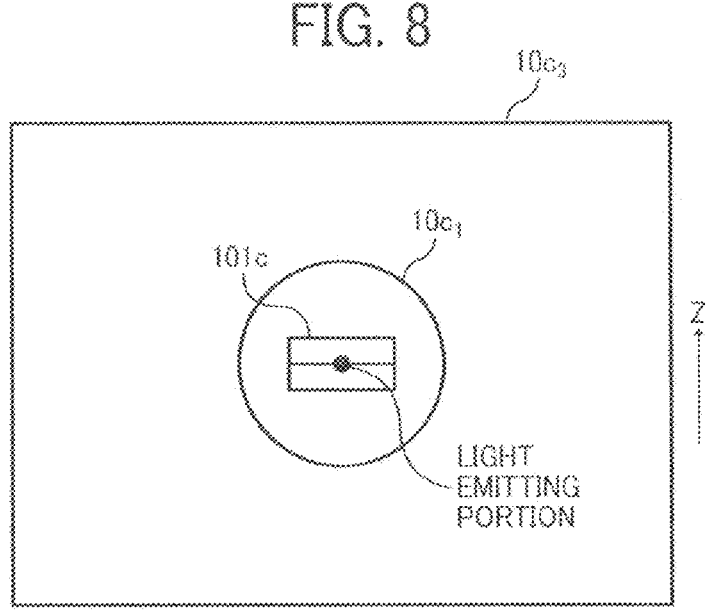
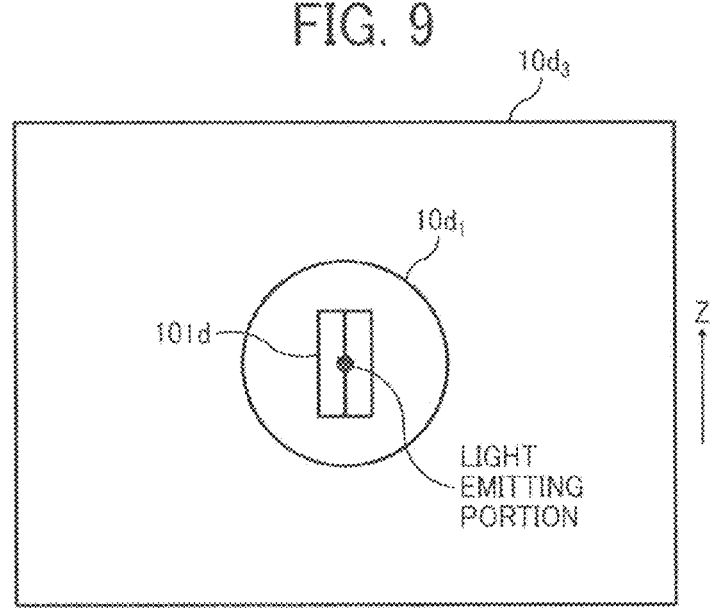

FIG. 39
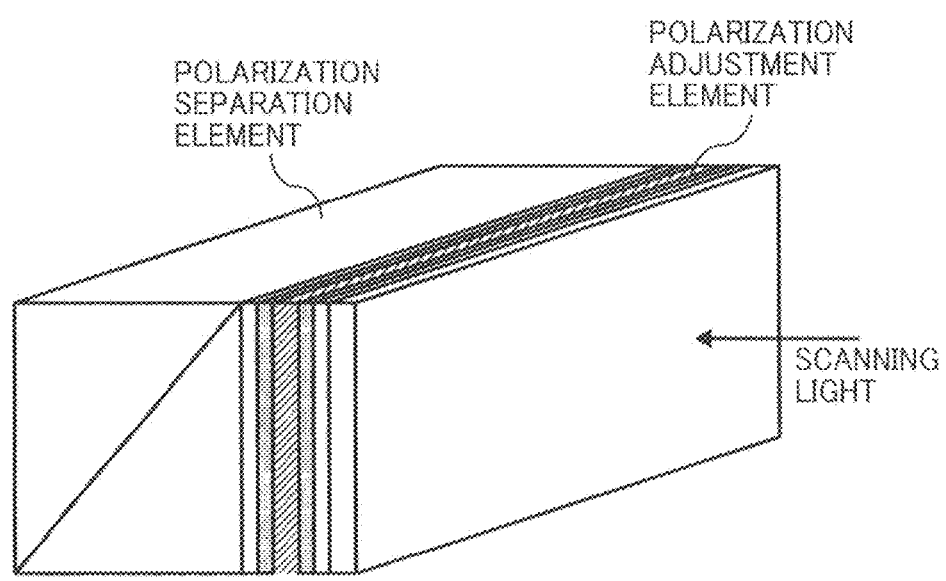
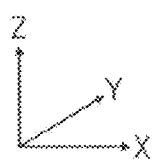

OPTICAL SCANNING DEVICE AND IMAGE FORMING APPARATUS

CROSS-REFERENCE TO RELATED APPLICATION

This patent application is based on and claims priority pursuant to 35 U.S.C. §119 to Japanese Patent Application No. 2011-205668, filed on Sep. 21, 2011, in the Japan Patent Office, the entire disclosure of which is hereby incorporated by reference herein.

BACKGROUND OF THE INVENTION

1. Field of the Invention

The present invention relates to an optical scanning device and an image forming apparatus, more specifically to an optical scanning device which scans scan target surfaces with light and an image forming apparatus including the optical scanning device.

2. Description of the Related Art

In the field of electrophotographic image recording, an image forming apparatus using a laser is widely used. The image forming apparatus includes, for example, a photosensitive drum (hereinafter also referred to as the photoconductor drum) and an optical scanning device which forms a latent image on an outer circumferential surface of the photoconductor drum. The optical scanning device includes, for example, a light source which emits laser light, an optical deflector, such as a polygon mirror, for example, which deflects the laser light emitted from the light source, and a optical scanning system which collects the laser light deflected by the optical deflector onto the outer circumferential surface of the photoconductor drum.

In recent years, along with the colorization of images and the increase in processing speed of image forming apparatuses, a tandem-type image forming apparatus including a plurality of photosensitive drums (normally four) has been increasingly used.

The tandem-type image forming apparatus tends to be increased in size in accordance with the increase in the number of photoconductor drums. Therefore, there is demand for a reduction in device size, including a reduction in size of the optical scanning device. To reduce the size of the optical scanning device, it is effective to cause optical paths of a plurality of laser lights directed from the optical deflector toward the respective photoconductor drums to overlap one another.

For example, a recording device may include two laser light sources, a polarized light combining device, a deflection device, and a polarized light separating device. The two laser light sources radiate two laser lights linearly polarized in mutually perpendicular directions and modulated in brightness in accordance with signals to be recorded. The polarized light combining device combines the two laser lights radiated from the laser light sources. The deflection device deflects a resultant synthesized laser light in a main scanning direction. The polarized light separating device causes the synthesized laser light deflected by the deflection device to be separated and strike different spots on a surface to be scanned for recording.

Further, the optical scanning device may include a single laser light source, an information control device, a polarization control device, a scanning device, a separation device, and an optical rotation control device. The information control device provides mutually different information items to two polarized lights of a laser light emitted from the light source. The polarization control device controls the polarization amount on the basis of the information received from the information control device. The scanning device scans and irradiates a predetermined irradiation surface with the polarization-controlled light. The separation device separates the scanning light into two lights in accordance with the polarization state. The optical rotation control device performs an optical rotation control on the laser light in accordance with the angle of incidence of the light incident on the separation device from the scanning device.

Further, the optical scanning device may include a polarization separation device which causes a first light having a first polarization direction and a second light having a second polarization direction to be separated from each other.

The above-described devices, however, have difficulty in stably suppressing the generation of ghost light, i.e., optical noise, without causing an increase in cost and device size.

SUMMARY OF THE INVENTION

The present invention describes a novel optical scanning device. In one example, a novel optical scanning device separately scans a plurality of scan target surfaces in a first direction with light, and includes a light source unit, an optical deflector, an imaging optical element, a polarization adjustment element, and a polarization separation element. The light source unit is configured to emit a first light beam and a second light beam mutually different in polarization state. The optical deflector is configured to rotate around an axis parallel to a second direction perpendicular to the first direction, and deflect the first light beam and the second light beam emitted from the light source unit. The imaging optical element is provided on respective optical paths of the first light beam and the second light beam deflected by the optical deflector. The polarization adjustment element is provided on the optical paths of the first light beam and the second light beam transmitted through the imaging optical element, and is configured to correct respective changes in polarization state of the first light beam and the second light beam occurring during the transmission of the first light beam and the second light beam through the imaging optical element. The polarization separation element is provided on the optical paths of the first light beam and the second light beam emitted from the polarization adjustment element, and is configured to separate the first light beam and the second light beam from each other.

At least one of the first light beam and the second light beam may satisfy a relationship $|\theta_3(\Phi_N)-\theta_2(\Phi_N)+\theta_1(\Phi_N)|>|\theta_3(\Phi_N)-\theta_2(\Phi_N)+\theta_0(\Phi_N)|$. "$\Phi$" may represent an angle formed between a light beam incident on the polarization separation element and a plane parallel to the second direction and including a normal line of an incidence position of the light beam in the polarization separation element. "$\theta_0(\Phi)$" may represent an angle formed between the plane and a major axis direction of a polarized light of the light beam at the time of incidence of the light beam on the imaging optical element. "$\theta_1(\Phi)$" may represent an angle formed between the plane and the major axis direction of the polarized light of the light beam at the time of incidence of the light beam on the polarization adjustment element. "$\theta_2(\Phi)$" may represent an angle formed between the plane and the major axis direction of the polarized light of the light beam at the time of incidence of the light beam on the polarization separation element. "$\Phi_N$" may represent an angle formed between the light beam incident on the polarization separation element and the plane, and corresponding to the maximum value of the difference between the angles $\theta_0(\Phi)$ and $\theta_1(\Phi)$. "$\theta_3(\Phi)$" may represent, when a linearly polarized light having the same wavelength as the wavelength of the light beam is incident on the polarization separation element at the angle $\Phi_N$, an angle formed between the plane and a polarization direction of the linearly polarized light corresponding to a maximum extinction ratio.

At least one of the first light beam and the second light beam satisfies a relationship $|P_0(\Phi_M)-P_1(\Phi_M)|>|P_0(\Phi_M)-P_2(\Phi_M)|$. "$\Phi$" may represent an angle formed between a light beam incident on the polarization separation element and a plane parallel to the second direction and including a normal line of an incidence position of the light beam in the polarization separation element. "$P_0(\Phi)$" may represent a degree of polarization at the time of incidence of the light beam on the imaging optical element. "$P_1(\Phi)$" may represent a degree of polarization at the time of incidence of the light beam on the polarization adjustment element. "$P_2(\Phi)$" may represent a degree of polarization at the time of incidence of the light beam on the polarization separation element. "$\Phi_M$" may represent an angle formed between the light beam incident on the polarization separation element and the plane, and corresponding to the maximum value of the difference between the degrees of polarization $P_0(\Phi)$ and $P_1(\Phi)$.

At least one of the first light beam and the second light beam satisfies a relationship $|\theta_0(\Phi_N)-\theta_1(\Phi_N)|>|\theta_0(\Phi_N)-\theta_2(\Phi_N)|$. "$\Phi$" may represent an angle formed between a light beam incident on the polarization separation element and a plane parallel to the second direction and including a normal line of an incidence position of the light beam in the polarization separation element. "$\theta_0(\Phi)$" may represent an angle formed between the plane and a major axis direction of a polarized light of the light beam at the time of incidence of the light beam on the imaging optical element. "$\theta_1(\Phi)$" may represent an angle formed between the plane and the major axis direction of the polarized light of the light beam at the time of incidence of the light beam on the polarization adjustment element. "$\theta_2(\Phi)$" may represent an angle formed between the plane and the major axis direction of the polarized light of the light beam at the time of incidence of the light beam on the polarization separation element. "$\Phi_N$" may represent an angle formed between the light beam incident on the polarization separation element and the plane, and corresponding to the maximum value of the difference between the angles $\theta_0(\Phi)$ and $\theta_1(\Phi)$.

The polarization separation element may include a polarization separation surface formed by a wire grid.

The imaging optical element may be made of resin.

The polarization adjustment element may include a liquid crystal element including a nematic liquid crystal layer held between a pair of transparent plates via oriented films. At least one of the oriented films may have an orientation direction changed in accordance with the angle of incidence of light.

The polarization adjustment element and the polarization separation element may form a single unit.

The present invention further describes a novel image forming apparatus. In one example, a novel image forming apparatus includes a plurality of image carriers each configured to carry an image, and the above-described optical scanning device configured to scan the plurality of image carriers with light.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein:

FIG. 5 is a diagram illustrating one light source provided in the first light source unit;

FIG. 6 is a diagram illustrating the other light source provided in the first light source unit;

FIG. 7 is a diagram illustrating a second light source unit provided in the optical scanning device, FIG. 8 is a diagram illustrating one light source provided in the second light source unit;

FIG. 9 is a diagram illustrating the other light source provided in the second light source unit;

FIG. 39 is a diagram illustrating the integration of the polarization adjustment element and the polarization separation element.

DETAILED DESCRIPTION OF THE INVENTION

Figure 1:
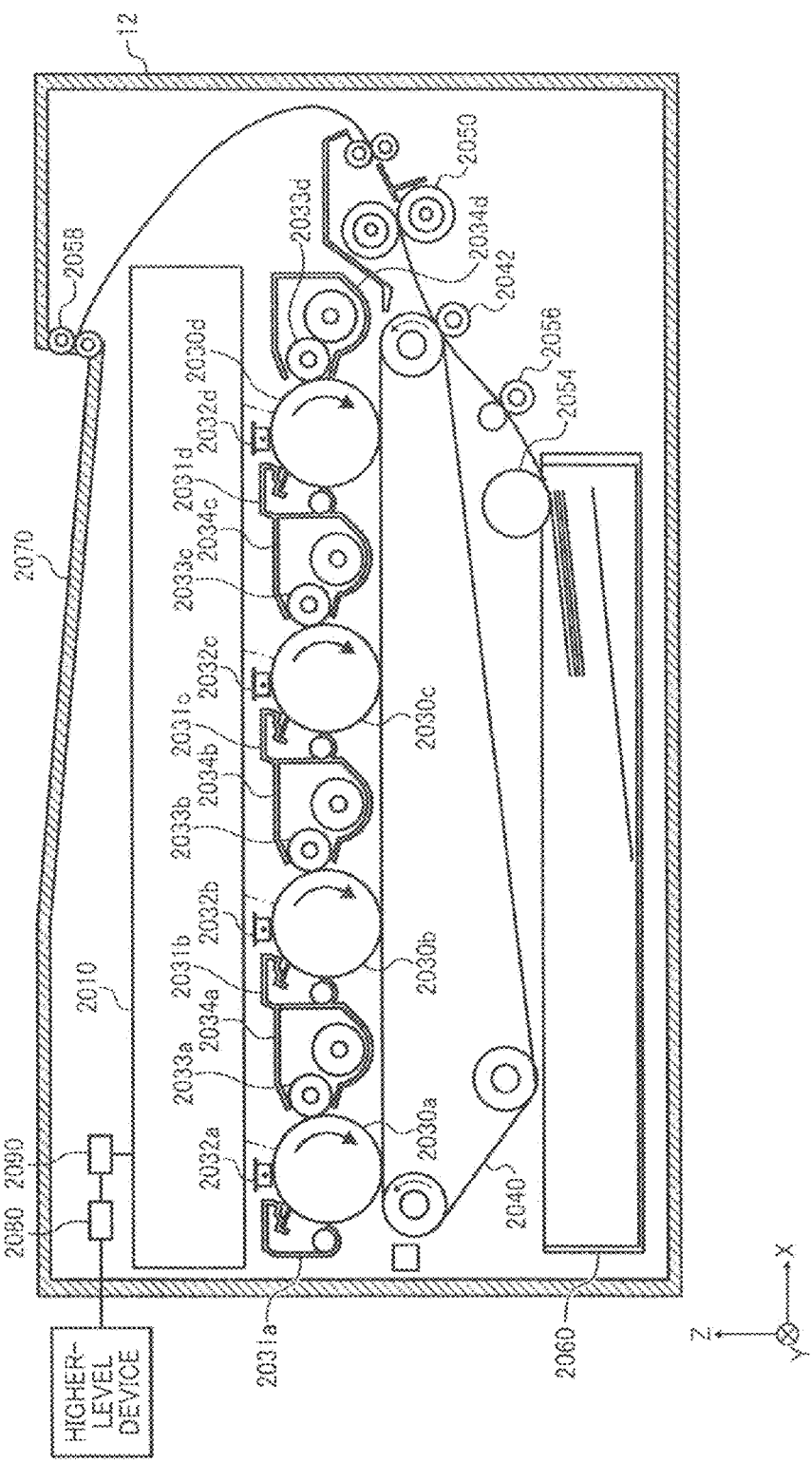
FIG. 1 is a diagram illustrating a schematic configuration of a color printer according to an embodiment of the present invention.

In describing the embodiments illustrated in the drawings, specific terminology is adopted for the purpose of clarity. However, the disclosure of the present invention is not intended to be limited to the specific terminology so used, and it is to be understood that substitutions for each specific element can include any technical equivalents that operate in a similar manner and achieve a similar result.

Referring now to the drawings, wherein like reference numerals designate identical or corresponding parts throughout the several views, an embodiment of the present invention will be described. FIG. 1 illustrates a schematic configuration of a color printer 2000 according to an embodiment of the present invention.

The color printer 2000 is a tandem-type multicolor printer which forms a full-color image by superimposing four colors of black, cyan, magenta, and yellow. The color printer 2000 includes, for example, an optical scanning device 2010, four photoconductor drums 2030a, 2030b, 2030c, and 2030d, four cleaning units 2031a, 2031b, 2031c, and 2031d, four charging devices 2032a, 2032b, 2032c, and 2032d, four development rollers 2033a, 2033b, 2033c, and 2033d, four toner cartridges 2034a, 2034b, 2034c, and 2034d, a transfer belt 2040, a transfer roller 2042, a fixing roller pair 2050, a sheet feeding roller 2054, a registration roller pair 2056, a sheet discharging roller pair 2058, a sheet feeding tray 2060, a sheet discharging tray 2070, a communication control device 2080, and a printer control device 2090 which provides an overall control of the above-described devices.

The communication control device 2080 controls the communication between the color printer 2000 and a higher-level device, such as a personal computer, for example, connected to the color printer 2000 via a network or the like.

The printer control device 2090 includes, for example, a central processing unit (CPU), a read-only memory (ROM) which stores a program described in codes readable by the CPU and a variety of data used to execute the program, a random access memory (RAM) which serves as a working memory, and an analog-to-digital (AD) converter which converts analog data into digital data. Further, the printer control device 2090 transmits to the optical scanning device 2010 image data received from the higher-level device.

The photoconductor drum 2030a, the charging device 2032a, the development roller 2033a, the toner cartridge 2034a, and the cleaning unit 2031a are used as one group, and form an image forming station for forming an image of the black color (hereinafter also referred to as the K station for convenience).

The photoconductor drum 2030b, the charging device 2032b, the development roller 2033b, the toner cartridge 2034b, and the cleaning unit 2031b are used as one group, and form an image forming station for forming an image of the cyan color (hereinafter also referred to as the C station for convenience).

The photoconductor drum 2030c, the charging device 2032c, the development roller 2033c, the toner cartridge 2034c, and the cleaning unit 2031c are used as one group, and form an image forming station for forming an image of the magenta color (hereinafter also referred to as the M station for convenience).

The photoconductor drum 2030d, the charging device 2032d, the development roller 2033d, the toner cartridge 2034d, and the cleaning unit 2031d are used as one group, and form an image forming station for forming an image of the yellow color (hereinafter also referred to as the Y station for convenience).

Each of the photoconductor drums 2030a to 2030d has an outer circumferential surface formed of a photosensitive layer. That is, the outer circumferential surface of each of the photoconductor drums 2030a to 2030d is a scan target surface. The outer circumferential surface of each of the photoconductor drums 2030a to 2030d is rotated in the direction of the corresponding arrow in FIG. 1 by a not-illustrated rotation mechanism.

The following description will be made on the assumption that, in an XYZ three-dimensional orthogonal coordinate system, a Y-axis direction (i.e., +Y or −Y direction) is parallel to the longitudinal direction of the photoconductor drums 2030a to 2030d, i.e., parallel to the direction of the respective axes of rotation of the photoconductor drums 2030a to 2030d, an X-axis direction (i.e., +X or −X direction) is parallel to the direction of arrangement of the four photoconductor drums 2030a to 2030d, and a Z-axis direction (i.e., +Z or −Z direction) is parallel to the vertical direction of the color printer 2000. In FIG. 1, the +X direction corresponds to the rightward direction, and the +Z direction corresponds to the upward direction. Further, the +Y direction corresponds to the direction from the near side toward the far side of the drawing. The −X direction, the −Y direction, and the −Z direction are opposite to the +X direction, the +Y direction, and the +Z direction, respectively.

Further, throughout the drawings, a cross mark inside a white circle represents an arrow directed from the near side toward the far side of the drawings, and a black dot inside a white circle represents an arrow directed from the far side toward the near side of the drawings.

Each of the charging devices 2032a to 2032d uniformly charges the outer circumferential surface of the corresponding one of the photoconductor drums 2030a to 2030d.

On the basis of multicolor image data (i.e., black image data, cyan image data, magenta image data, and yellow image data) received from the higher-level device, the optical scanning device 2010 irradiates the charged outer circumferential surfaces of the photoconductor drums 2030a to 2030d with light beams modulated for the respective colors. Thereby, charge is removed in light-irradiated portions of the outer circumferential surfaces of the photoconductor drums 2030a to 2030d, and latent images corresponding to the image data are formed on the outer circumferential surfaces of the photoconductor drums 2030a to 2030d. In accordance with the rotation of the photoconductor drums 2030a to 2030d, the formed latent images move toward the respective development rollers 2033a to 2033d. The configuration of the optical scanning device 2010 will be described later.

In accordance with the rotation of each of the development rollers 2033a to 2033d, the toner stored in the corresponding one of the toner cartridges 2034a to 2034d is thinly and uniformly applied to the outer circumferential surface of the each of the development rollers 2033a to 2033d. Then, the toner on the outer circumferential surface of the each of the development rollers 2033a to 2033d comes into contact with the outer circumferential surface of the corresponding one of the photoconductor drums 2030a to 2030d, and is transferred and adheres to the light-irradiated portions of the outer circumferential surface. That is, each of the development rollers 2033a to 2033d causes the toner to adhere to the latent image formed on the outer circumferential surface of the corresponding one of the photoconductor drums 2030a to 2030d, and thereby develops the latent image into a visible image. Then, in accordance with the rotation of the photoconductor drums 2030a to 2030d, the respective images having the toners adhering thereto, i.e., toner images move toward the transfer belt 2040.

The respective toner images of the yellow, magenta, cyan, and black colors are sequentially transferred and superimposed onto the transfer belt 2040 with predetermined timing. Thereby, a color image is formed.

The sheet feeding tray 2060 stores recording sheets each serving as a recording medium. The sheet feeding roller 2054 is disposed near the sheet feeding tray 2060, and picks up the recording sheets one by one from the sheet feeding tray 2060. Each of the recording sheets is sent toward a gap between the transfer belt 2040 and the transfer roller 2042 with predetermined timing. Thereby, the color image on the transfer belt 2040 is transferred onto the recording sheet. The recording sheet having the color image transferred thereto is sent to the fixing roller pair 2050.

With the fixing roller pair 2050, heat and pressure are applied to the recording sheet, and thereby the toners are fixed on the recording sheet. The recording sheet having the toners fixed thereon is then sent to the sheet discharging tray 2070 via the sheet discharging roller pair 2058. The thus-sent recording sheets are sequentially stacked on the sheet discharging tray 2070.

Each of the cleaning units 2031a to 2031d removes residual toner remaining on the outer circumferential surface of the corresponding one of the photoconductor drums 2030a to 2030d. After the removal of the residual toner, the outer circumferential surface of each of the photoconductor drums 2030a to 2030d returns to the position facing the corresponding one of the charging devices 2032a to 2032d.

The configuration of the optical scanning device 2010 will now be described. As illustrated in an example of FIGS. 2 and 3, the optical scanning device 2010 includes, for example, two light source units LU1 and LU2, two cylindrical lenses $12_1$ and $12_2$, a polygon mirror 14, two scanning lenses $15_1$ and $15_2$, two polarization adjustment elements $21_1$ and $21_2$, two polarization separation elements $16_1$ and $16_2$, two reflecting mirrors $17_1$ and $17_2$, four turning mirrors 18a, 18b, 18c, and 18d, dust-proof glasses 19a, 19b, 19e, and 19d, and a not-illustrated scanning control device.

For convenience, a direction corresponding to the main scanning direction and a direction corresponding to the sub-scanning direction will be hereinafter simply referred to as the main scanning corresponding direction and the sub-scanning corresponding direction, respectively.

Figure 4:
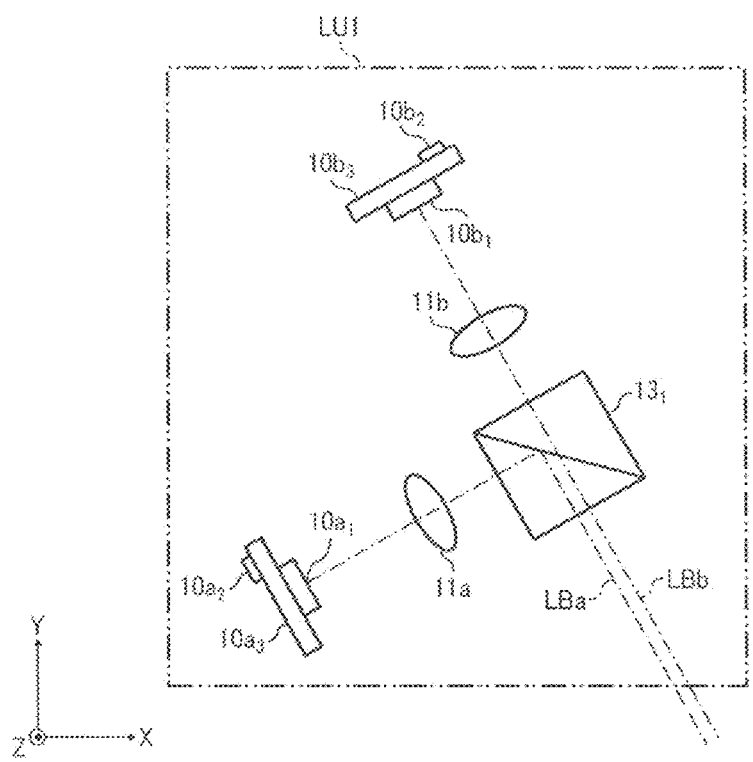
FIG. 4 is a diagram illustrating a first light source unit provided in the optical scanning device.

As illustrated in an example of FIG. 4, the light source unit LU1 includes, for example, two light sources $10a_1$ and $10b_1$, two collimating lenses 11a and 11b, and a light combining element $13_1$.

The light source $10a_1$ is mounted on a circuit board $10a_3$ together with a drive chip $10a_2$ including a light source drive circuit for driving the light source $10a_1$. The light source $10b_1$ is mounted on a circuit board $10b_3$ together with a drive chip $10b_2$ including a light source drive circuit for driving the light source $10b_1$.

As illustrated in an example of FIG. 5, the light source $10a_1$ includes a semiconductor laser 101a. The semiconductor laser 101a is installed to emit a linearly polarized light having a polarization direction parallel to the Z-axis direction. For convenience, a linearly polarized light having a polarization direction parallel to the Z-axis direction will be hereinafter referred to as the vertically polarized light, and the vertically polarized light emitted from the semiconductor laser 101a will be described as the light beam LBa.

The adjustment of the installation angle of the semiconductor laser 101a may be replaced by the installation of an optical element, such as a half-wave plate, disposed between the semiconductor laser 101a and the light combining element $13_1$ to cause the light beam emitted from the semiconductor laser 101a to have a polarization direction corresponding to the direction of the vertically polarized light.

As illustrated in an example of FIG. 6, the light source $10b_1$ includes a semiconductor laser 101b. The semiconductor laser 101b is installed to emit a linearly polarized light having a polarization direction perpendicular to the Z-axis direction. For convenience, a linearly polarized light having a polarization direction perpendicular to the Z-axis direction will be hereinafter referred to as the horizontally polarized light, and the horizontally polarized light emitted from the semiconductor laser 101b will be described as the light beam LBb.

The adjustment of the installation angle of the semiconductor laser 101b may be replaced by the installation of an optical element, such as a half-wave plate, disposed between the semiconductor laser 101b and the light combining element $13_1$ to cause the light beam emitted from the semiconductor laser 101b to have a polarization direction corresponding to the direction of the horizontally polarized light.

Returning to FIG. 4, the collimating lens 11a is disposed on the optical path of the light beam LBa emitted from the light source $10a_1$, and collimates the light beam LBa into a substantially parallel light. The collimating lens 11b is disposed on the optical path of the light beam LBb emitted from the light source $10b_1$, and collimates the light beam LBb into a substantially parallel light.

The light combining element $13_1$ is disposed on the optical path of the light beam LBa transmitted through the collimating lens 11a and the optical path of the light beam LBb transmitted through the collimating lens 11b. The light combining element $13_1$ has a surface which reflects the vertically polarized light and transmits therethrough the horizontally polarized light. The light combining element $13_1$ combines the light beams LBa and LBb such that a principal ray of the light beam LBa and a principal ray of the light beam LBb overlap each other in the Z-axis direction. The light beams LBa and LBb emitted from the light combining element $13_1$ are emitted from the light source unit LU1.

As illustrated in an example of FIG. 7, the light source unit LU2 includes, for example, two light sources $10c_1$ and $10d_1$, two collimating lenses $11c$ and $11d$, and a light combining element $13_2$.

The light source $10c_1$ is mounted on a circuit board $10c_3$ together with a drive chip $10c_2$ including a light source drive circuit for driving the light source $10c_1$. The light source $10d_1$ is mounted on a circuit board $10d_3$ together with a drive chip $10d_2$ including a light source drive circuit for driving the light source $10d_1$.

As illustrated in an example of FIG. 8, the light source $10c_1$ includes a semiconductor laser $101c$. The semiconductor laser $101c$ is installed to emit a horizontally polarized light. The horizontally polarized light emitted from the semiconductor laser $101c$ will be hereinafter described the light beam LBc.

The adjustment of the installation angle of the semiconductor laser $101c$ may be replaced by the installation of an optical element, such as a half-wave plate, disposed between the semiconductor laser $101c$ and the light combining element $13_2$ to cause the light beam emitted from the semiconductor laser $101c$ to have a polarization direction corresponding to the direction of the horizontally polarized light.

As illustrated in an example of FIG. 9, the light source $10d_1$ includes a semiconductor laser $101d$. The semiconductor laser $101d$ is installed to emit a vertically polarized light. The vertically polarized light emitted from the semiconductor laser $101d$ will be hereinafter described as the light beam LBd.

The adjustment of the installation angle of the semiconductor laser $101d$ may be replaced by the installation of an optical element, such as a half-wave plate, disposed between the semiconductor laser $101d$ and the light combining element $13_2$ to cause the light beam emitted from the semiconductor laser $101d$ to have a polarization direction corresponding to the direction of the vertically polarized light.

Returning to FIG. 7, the collimating lens $11c$ is disposed on the optical path of the light beam LBc emitted from the light source $10c_1$, and collimates the light beam LBc into a substantially parallel light. The collimating lens $11d$ is disposed on the optical path of the light beam LBd emitted from the light source $10d_1$, and collimates the light beam LBd into a substantially parallel light.

The light combining element $13_2$ is disposed on the optical path of the light beam LBc transmitted through the collimating lens $11c$ and the light beam LBd transmitted through the collimating lens $11d$. The light combining element $13_2$ has a surface which reflects the vertically polarized light and transmits therethrough the horizontally polarized light. The light combining element $13_2$ combines the light beams LBc and LBd such that a principal ray of the light beam LBc and a principal ray of the light beam LBd overlap each other in the Z-axis direction. The light beams LBc and LBd emitted from the light combining element $13_2$ are emitted from the light source unit LU2.

Returning to FIG. 2, the cylindrical lens $12_1$ causes the light beams LBa and LBb emitted from the light source unit LU1 to be imaged in the Z-axis direction near a deflective reflection surface of the polygon mirror 14. The cylindrical lens $12_2$ causes the light beams LBc and LBd emitted from the light source unit LU2 to be imaged in the Z-axis direction near the deflective reflection surface of the polygon mirror 14.

The polygon mirror 14 includes, for example, four mirror facets each serving as the deflective reflection surface. The polygon minor 14 rotates at a constant velocity around an axis parallel to the Z-axis direction, and causes the light beams LBa and LBb transmitted from the cylindrical lens $12_1$ and the light beams LBc and LBd transmitted from the cylindrical lens $12_2$ to be deflected at a constant angular velocity within a plane perpendicular to the Z-axis direction.

The light beams LBa and LBb are deflected to the −X direction side of the polygon mirror 14, and the light beams LBc and LBd are deflected to the +X direction side of the polygon mirror 14.

A light beam plane formed over time by the light beam deflected by the deflective reflection surface of the polygon mirror 14 is called a deflection plane (see Japanese Laid-Open Patent Application No. 11-202252, for example). Herein, the deflection plane is parallel to the X-Y plane.

Figure 2:
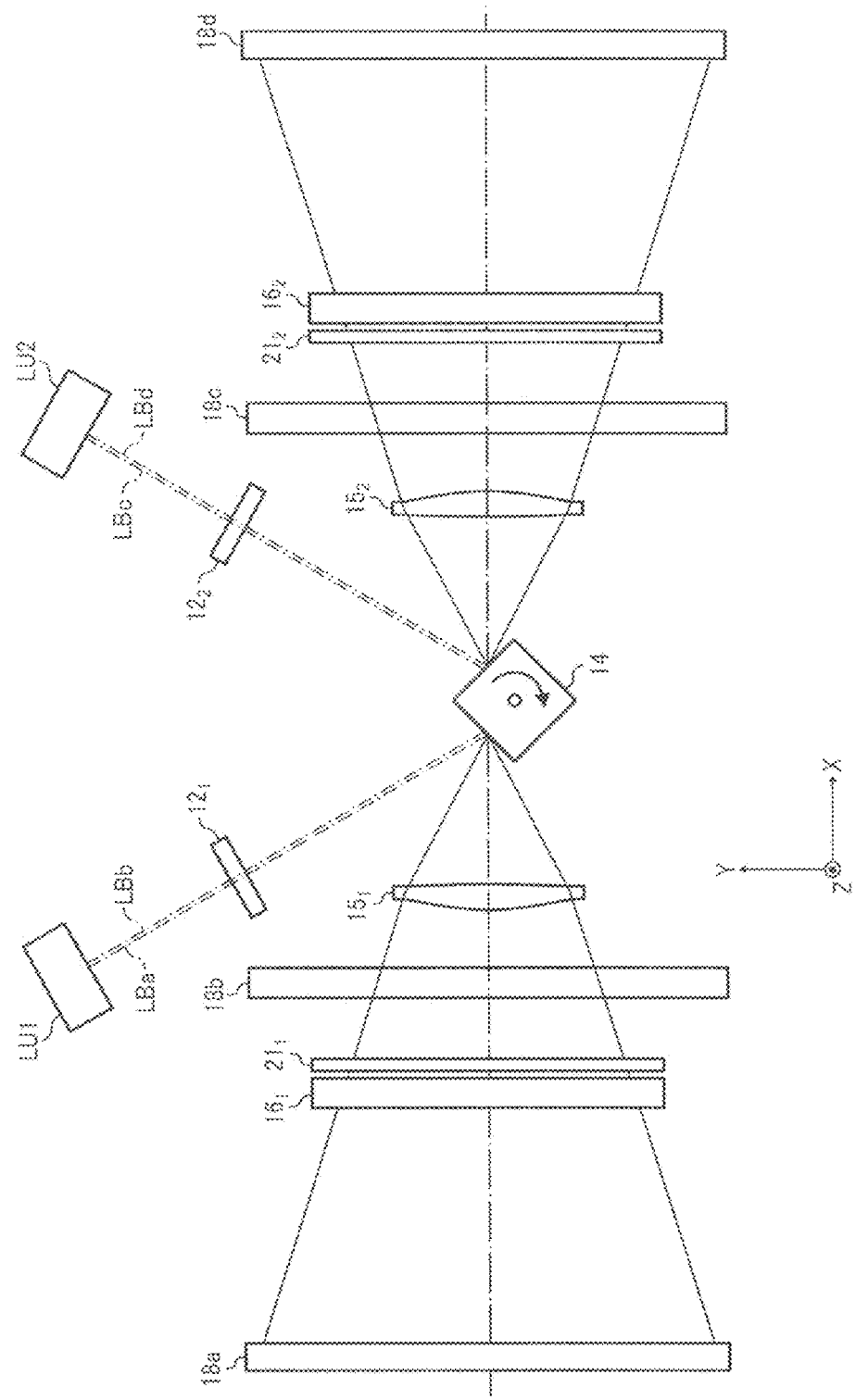
FIG. 2 is a diagram illustrating an optical scanning device provided in the color printer.

In FIG. 2, the scanning lens $15_1$ is located on the −X direction side of the polygon mirror 14, and is disposed on the respective optical paths of the light beams LBa and LBb deflected by the polygon mirror 14.

The polarization adjustment element $21_1$ is located on the −X direction side of the scanning lens $15_1$, and is disposed on the optical paths of the light beams LBa and LBb transmitted through the scanning lens $15_1$. The polarization adjustment element $21_1$ converts the polarization state of the light beams LBa and LBb emitted from the scanning lens $15_1$ into a polarization state more suitable for polarization separation performed by the polarization separation element $16_1$ at a subsequent stage.

Figure 10:
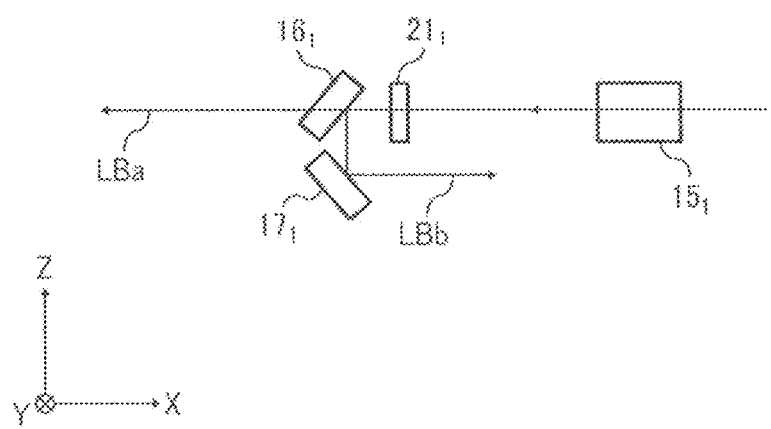
FIG. 10 is a diagram illustrating the incidence of a light beam on one polarization adjustment element and one polarization separation element in the optical scanning device.

The polarization separation element $16_1$ is located on the −X direction side of the polarization adjustment element $21_1$, and is disposed on the optical paths of the light beams LBa and LBb emitted from the polarization adjustment element $21_1$. Then, as illustrated in FIG. 10, the polarization separation element $16_1$ transmits therethrough the light beam LBa and reflects the light beam LBb in the −Z direction, to thereby separate the light beams LBa and LBb from each other.

Figure 3:
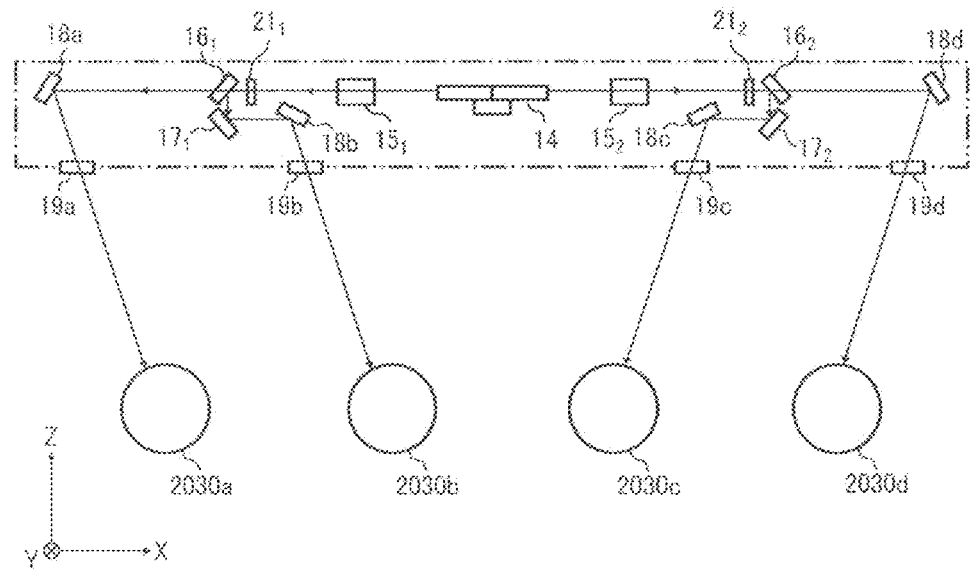
FIG. 3 is another diagram illustrating the optical scanning device.

As illustrated in FIG. 3, the light beam LBa transmitted through the polarization separation element $16_1$ is directed onto the outer circumferential surface of the photoconductor drum 2030a via the turning mirror 18a and the dust-proof glass 19a. Meanwhile, the light beam LBb reflected in the −Z direction by the polarization separation element $16_1$ is reflected in the +X direction by the reflecting mirror $17_1$, and is directed onto the outer circumferential surface of the photoconductor drum 2030b via the turning mirror 18b and the dust-proof glass 19b.

The scanning lens $15_2$ is located on the +X direction side of the polygon mirror 14, and is disposed on the respective optical paths of the light beams LBc and LBd deflected by the polygon mirror 14.

The polarization adjustment element $21_2$ is located on the +X direction side of the scanning lens $15_2$, and is disposed on the optical paths of the light beams LBc and LBd transmitted through the scanning lens $15_2$. The polarization adjustment element $21_2$ converts the polarization state of the light beams LBc and LBd emitted from the scanning lens $15_2$ into a polarization state more suitable for polarization separation performed by the polarization separation element $16_2$ at a subsequent stage.

Figure 11:
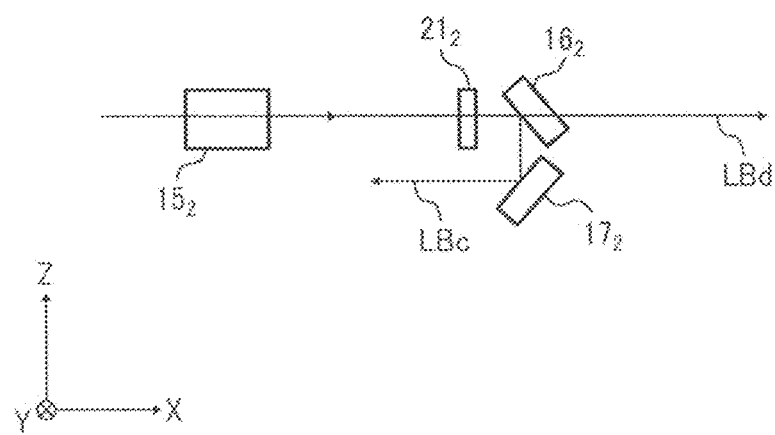
FIG. 11 is a diagram illustrating the incidence of a light beam on the other polarization adjustment element and the other polarization separation element in the optical scanning device.

The polarization separation element $16_2$ is located on the +X direction side of the polarization adjustment element $21_2$, and is disposed on the optical paths of the light beams LBc and LBd emitted from the polarization adjustment element $21_2$. Then, as illustrated in FIG. 11, the polarization separation element $16_2$ transmits therethrough the light beam LBd and reflects the light beam LBc in the −Z direction, to thereby separate the light beams LBc and LBd from each other.

The light beam LBc reflected in the −Z direction by the polarization separation element $16_2$ is reflected in the −X direction by the reflecting mirror $17_2$, and is applied to the outer circumferential surface of the photoconductor drum 2030c via the turning mirror 18c and the dust-proof glass 19c. Meanwhile, the light beam LBd transmitted through the polarization separation element $16_2$ is applied to the outer circumferential surface of the photoconductor drum 2030d via the turning mirror 18d and the dust-proof glass 19d.

The scanning lens $15_1$, the polarization adjustment element $21_1$, the polarization separation element $16_1$, the turning mirror 18a, and the dust-proof glass 19a form an optical scanning system for the K station. The scanning lens $15_1$, the polarization adjustment element $21_1$, the polarization separation element $16_1$, the reflecting mirror $17_1$, the turning mirror 18b, and the dust-proof glass 19b form an optical scanning system for the C station. That is, the scanning lens $15_1$, the polarization adjustment element $21_1$, and the polarization separation element $16_1$ are shared by two of the image forming stations.

The scanning lens $15_2$, the polarization adjustment element $21_2$, the polarization separation element $16_2$, the reflecting mirror $17_2$, the turning mirror 18c, and the dust-proof glass 19c form an optical scanning system for the M station. The scanning lens $15_2$, the polarization adjustment element $21_2$, the polarization separation element $16_2$, the turning mirror 18d, and the dust-proof glass 19d form an optical scanning system for the Y station. That is, the scanning lens $15_2$, the polarization adjustment element $21_2$, and the polarization separation element $16_2$ are shared by another two of the image forming stations.

Further, the turning mirrors 18a to 18d are disposed such that the respective image forming stations have the same optical path length.

In accordance with the rotation of the polygon mirror 14, respective light spots on the photoconductor drums 2030a to 2030d move in the longitudinal direction of the photoconductor drums 2030a to 2030d. In this process, the moving direction of the light spots corresponds to the main scanning direction, and the rotation direction of the photoconductor drums 2030a to 2030d corresponds to the sub-scanning direction.

Each of the photoconductor drums 2030a to 2030d has a scanning area extending in the main scanning direction, in which the image data is written. The scanning area is also called an effective scanning area, an image forming area, or an effective image area, for example.

The not-illustrated scanning control device drives the light sources $10a_1$ to $10d_1$ in accordance with the black image data, the cyan image data, the magenta image data, and the yellow image data, respectively.

The light beam LBa applied to the outer circumferential surface of the photoconductor drum 2030a, the light beam LBb applied to the outer circumferential surface of the photoconductor drum 2030b, the light beam LBc applied to the outer circumferential surface of the photoconductor drum 2030c, and the light beam LBd applied to the outer circumferential surface of the photoconductor drum 2030d serve as writing light beams.

Meanwhile, the light beam LBb applied to the outer circumferential surface of the photoconductor drum 2030a, the light beam LBa applied to the outer circumferential surface of the photoconductor drum 2030b, the light beam LBd applied to the outer circumferential surface of the photoconductor drum 2030c, and the light beam LBc applied to the outer circumferential surface of the photoconductor drum 2030d act as ghost lights, i.e., optical noise.

In the present embodiment, a resin lens is used in each of the scanning lenses $15_1$ and $15_2$. A resin lens is easier to process into an aspheric shape, more suitable to obtain desired optical performance, and manufacturable at lower cost than a glass lens is.

The resin lens, however, tends to cause birefringence, which in turn causes such phenomena as the change in polarization state of the incident light, e.g., a change from linear polarization to elliptical polarization, and the rotation of the polarization direction.

Further, if a polarization separation element is provided at a stage subsequent to a scanning lens, and if the polarization state of the incident light is changed at the scanning lens, the polarization separation element fails to perform desired polarization separation.

In the present embodiment, therefore, the polarization adjustment element $21_1$ is provided between the scanning lens $15_1$ and the polarization separation element $16_1$, and the polarization adjustment element $21_2$ is provided between the scanning lens $15_2$ and the polarization separation element $16_2$.

Figure 12:
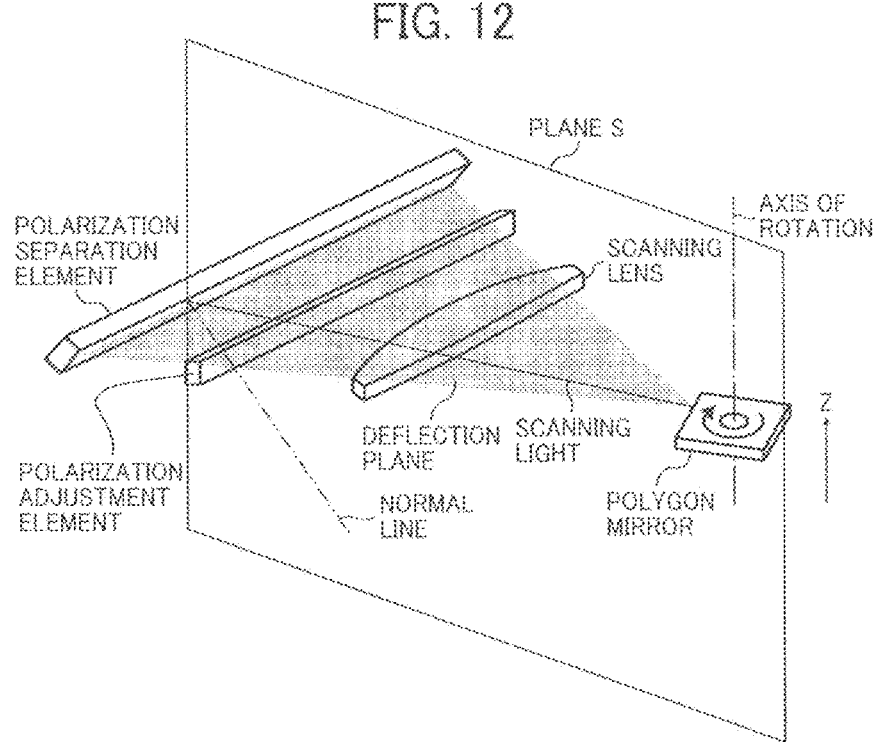
FIG. 12 is a diagram illustrating a plane.
Figure 13:
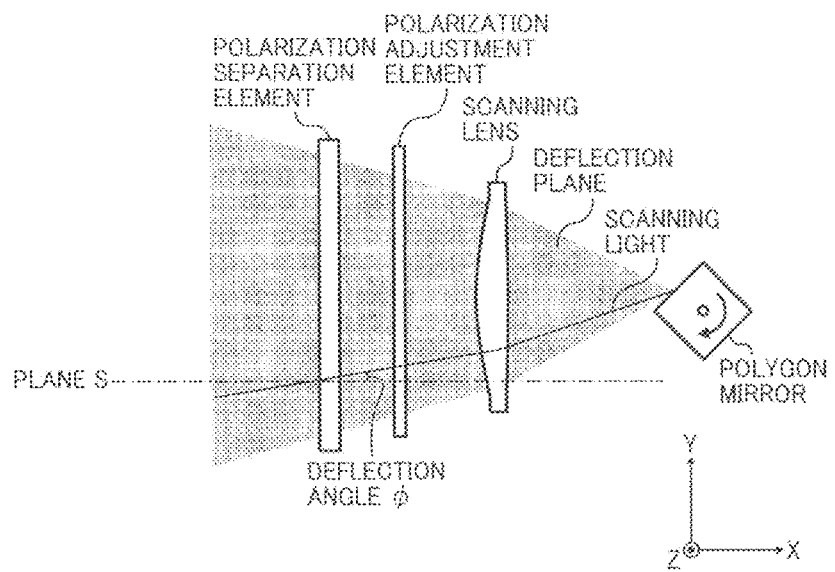
FIG. 13 is a diagram illustrating a deflection angle.

Description will now be made of a first configuration of the polarization adjustment elements $21_1$ and $21_2$. Herein, as illustrated in an example of FIGS. 12 and 13, a plane parallel to the axis of rotation of a polygon mirror (i.e., the polygon mirror 14 in the present embodiment) and including a normal line of a light incidence position in an incident surface of a polarization separation element will be described as a plane S. Further, the angle formed between the plane S and the light incident on the polarization separation element, i.e., scanning light, as viewed in the Z-axis direction, will be described as the deflection angle Φ.

In the first configuration of the polarization adjustment elements $21_1$ and $21_2$, a degree of polarization P will be discussed. The value of the degree of polarization P is 1 in linear polarization and 0 in circular polarization. Further, the value of the degree of polarization P is expressed by the following formula (1) in elliptical polarization. In the formula (1), $I_a$ represents the light intensity in the major axis direction, and $I_b$ represents the light intensity in the minor axis direction. In linear polarization, the value of the light intensity $I_b$ in the minor axis direction is 0.

$$P=(I_a-I_b)/(I_a+I_b) \quad (1)$$

Further, $P_0(\Phi)$ represents the degree of polarization at the time at which the scanning light is incident on the scanning lens, and $P_1(\Phi)$ represents the degree of polarization at the time at which the scanning light emitted from the scanning lens is incident on the polarization adjustment element. Further, $P_2(\Phi)$ represents the degree of polarization at the time at which the scanning light emitted from the polarization adjustment element is incident on the polarization separation element, and $\Phi_M$ represents the deflection angle corresponding to the maximum value of the difference between the degrees of polarization $P_0(\Phi)$ and $P_1(\Phi)$.

Herein, the polarization adjustment element $21_1$ is configured such that at least one of the light beams LBa and LBb satisfies the following formula (2).

$$|P_0(\Phi_M)-P_1(\Phi_M)|>|P_0(\Phi_M)-P_2(\Phi_M)| \quad (2)$$

Further, the polarization adjustment element $21_2$ is configured such that at least one of the light beams LBc and LBd satisfies the above formula (2).

Herein, each of the polarization adjustment elements $21_1$ and $21_2$ functions to cause the degree of polarization having changed from the degree of polarization $P_0(\Phi)$ to the degree of polarization $P_1(\Phi)$ to approach the degree of polarization $P_0(\Phi)$ when the scanning light is incident on the corresponding one of the polarization separation elements $16_1$ and $16_2$.

In the present embodiment, the light transmission position in the scanning lenses $15_1$ and $15_2$ varies depending on the deflection angle $\Phi$. Further, the degree of birefringence in the scanning lenses $15_1$ and $15_2$ varies depending on the location of the scanning lenses $15_1$ and $15_2$. Therefore, the value of the degree of polarization $P_1(\Phi)$ changes in accordance with the deflection angle $\Phi$.

Figure 14:
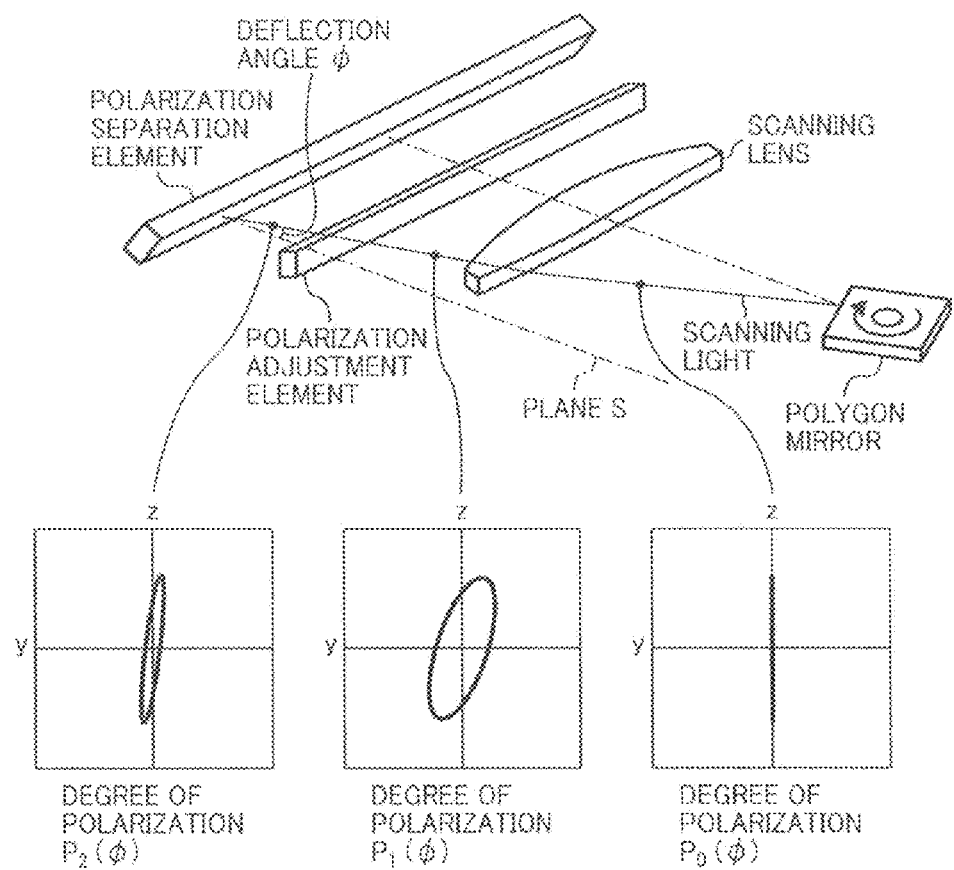
FIG. 14 is a diagram illustrating first to third degrees of polarization.

FIG. 14 illustrates a specific example of the degrees of polarization $P_0(\Phi)$, $P_1(\Phi)$, and $P_2(\Phi)$. Although the scanning light is the vertically polarized light in this example, the same discussion also applies to a case where the scanning light is the horizontally polarized light.

In FIG. 14, a local coordinate system is used which has a y-z plane perpendicular to the direction of travel of the scanning light and has a z-axis direction corresponding to the foregoing Z-axis direction and a y-axis direction corresponding to the main scanning corresponding direction. It is assumed in the following that, in the local coordinate system, the clockwise direction from the +z direction side corresponds to the positive direction of the polarization direction of linear polarization and the major axis direction of elliptical polarization.

In FIG. 14, the polarization state corresponding to the degree of polarization $P_0(\Phi)$ is not substantially different from vertical polarization. However, vertical polarization may change into elliptical polarization depending on the shape or material of the collimating lens or the cylindrical lens, for example. It is assumed in the following that the value of the degree of polarization $P_0(\Phi)$ is 1 for the deflection angle $\Phi$ of the light beam traveling into the effective scanning area, unless otherwise specified.

It is highly possible that the degree of polarization $P_1(\Phi)$ is different from the degree of polarization $P_0(\Phi)$ owing to the birefringence in the scanning lens. The degree of the difference varies depending on the material or shape of the scanning lens and also on the deflection angle $\Phi$.

The polarization adjustment element causes the light beam incident thereon with the degree of polarization $P_1(\Phi)$ to be adjusted, i.e., converted into a light beam having the degree of polarization $P_2(\Phi)$, and emits the adjusted light beam. The polarization adjustment element is classified into two types, i.e., Type A and Type B, depending on how to determine the major axis direction of the emitted polarized light, and an appropriate type of polarization adjustment element is selected in accordance with the polarization separation element provided at the subsequent stage.

Figure 15A:
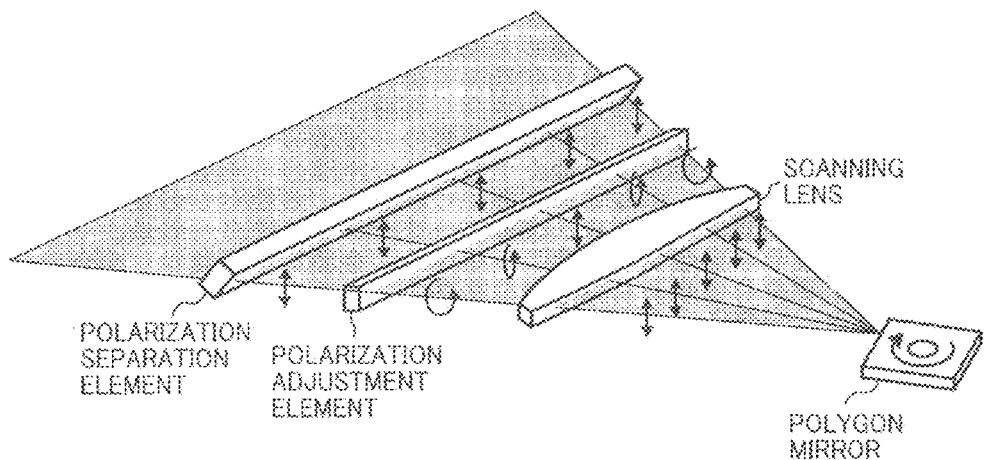
FIGS. 15A and 15B are diagrams illustrating the operation of a first type of polarization adjustment element.
Figure 15B:
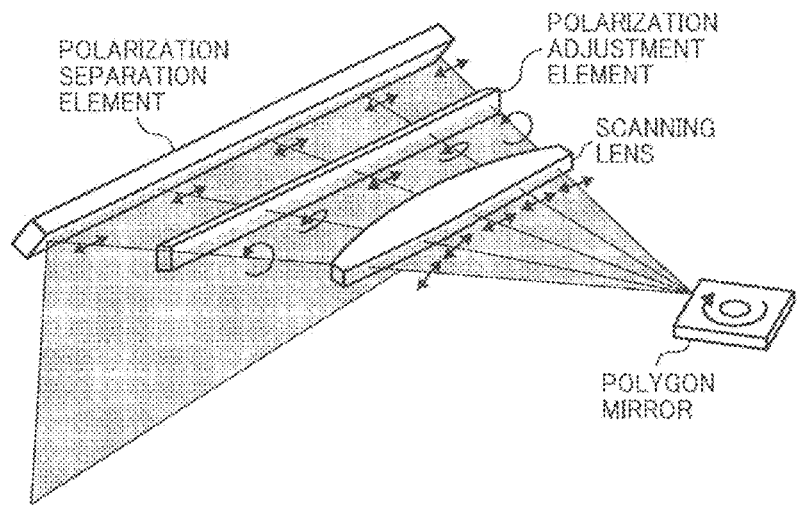

As illustrated in FIGS. 15A and 15B, the polarization adjustment element of Type A functions to adjust the light emitted from the scanning lens and changed in degree of polarization to the degree of polarization $P_1(\Phi)$ to have the degree of polarization $P_2(\Phi)$, and at the same time functions to align the major axis direction of the polarized light with the major axis direction of the light before being incident on the scanning lens. FIG. 15A illustrates a case where the light incident on the scanning lens is the vertically polarized light, and FIG. 15B illustrates a case where the light incident on the scanning lens is the horizontally polarized light.

Figure 16A:
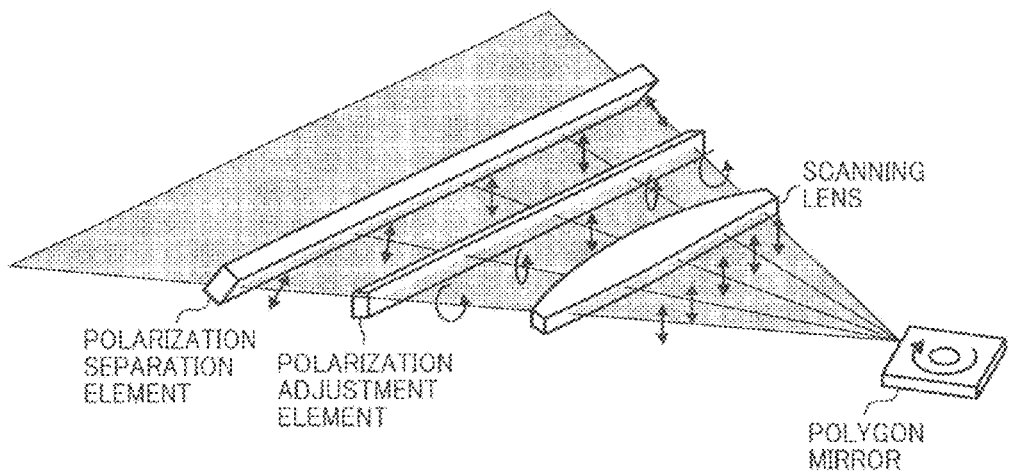
FIGS. 16A and 16B are diagrams illustrating the operation of a second type of polarization adjustment element.
Figure 16B:
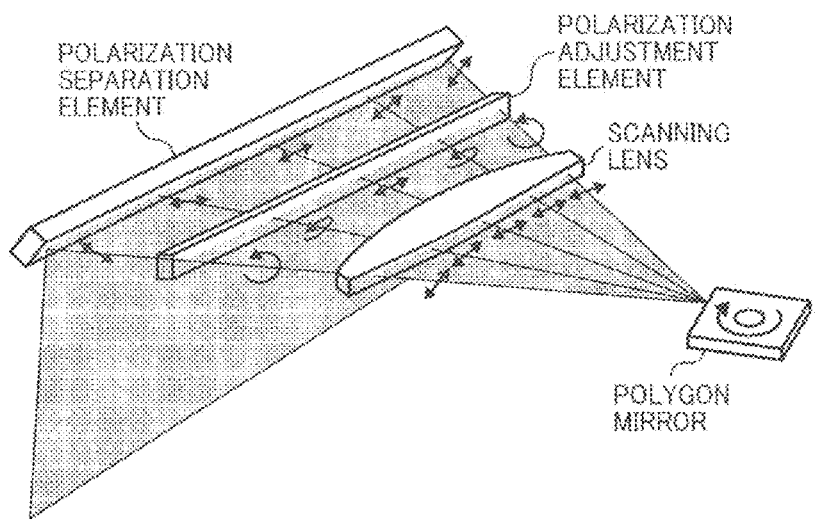

As illustrated in FIGS. 16A and 16B, the polarization adjustment element of Type B functions to adjust the light emitted from the scanning lens and changed in degree of polarization to the degree of polarization $P_1(\Phi)$ to have the degree of polarization $P_2(\Phi)$, and at the same time functions to change the major axis direction of the polarized light in accordance with the deflection angle $\Phi$. FIG. 16A illustrates a case where the light incident on the scanning lens is the vertically polarized light, and FIG. 16B illustrates a case where the light incident on the scanning lens is the horizontally polarized light.

Figure 17:
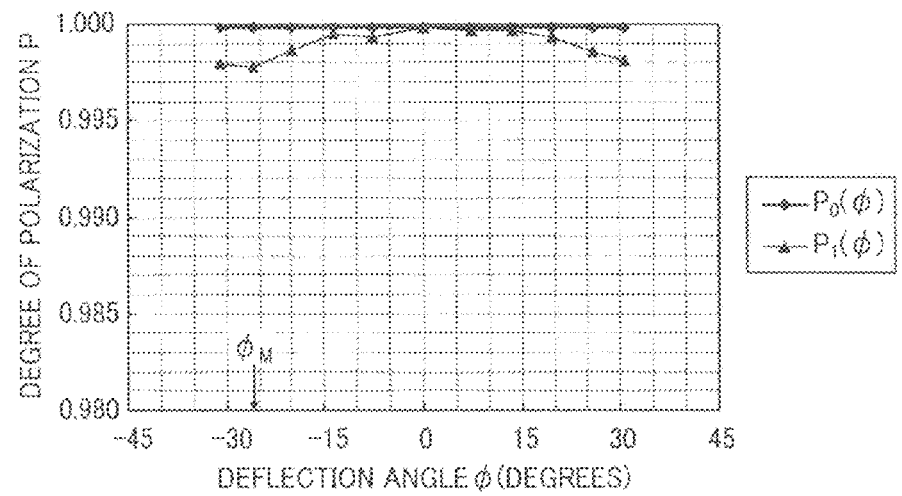
FIG. 17 is a diagram illustrating measurement results of the first and second degrees of polarization.

FIG. 17 illustrates an example of measurement results of the degrees of polarization $P_0(\Phi)$ and $P_1(\Phi)$. In this example, a resin lens molded from a cycloolefin polymer is used as the scanning lens, and the light beam emitted from the light source has a wavelength of approximately 655 nm. These measurement conditions are the same as the measurement conditions used in other measurements described later. The deflection angle $\Phi_M$ corresponding to the maximum value of the difference between the degrees of polarization $P_0(\Phi)$ and $P_1(\Phi)$ is approximately $-25.9$ degrees. In this case, the respective values of the degrees of polarization $P_0(\Phi_M)$ and $P_1(\Phi_M)$ are approximately 0.9997 and approximately 0.9978.

Figure 18:
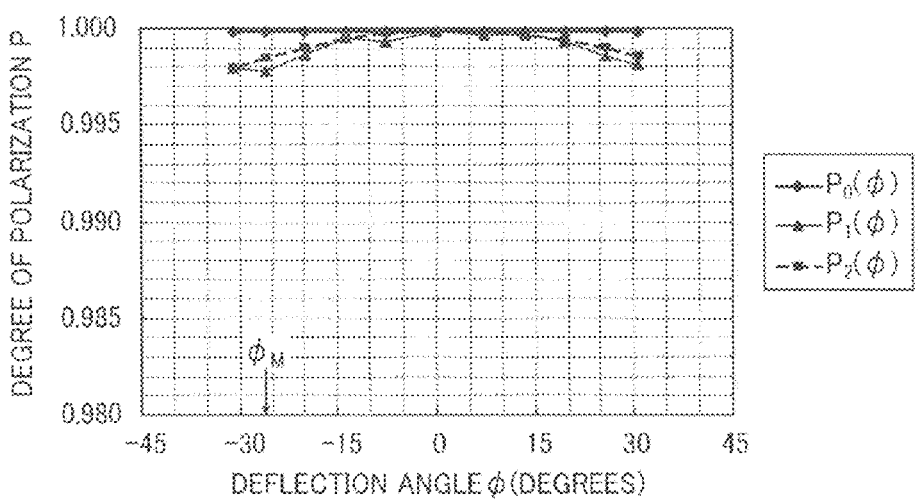
FIG. 18 is a diagram illustrating a measurement result of the third degree of polarization obtained by the use of the first type of polarization adjustment element.

FIG. 18 illustrates the measurement results of FIG. 17 and a measurement result of the degree of polarization $P_2(\Phi)$ obtained by the use of the polarization adjustment element of Type A. The value of the degree of polarization $P_2(\Phi_M)$ is approximately 0.9985. In this case, the relationship of the foregoing formula (2) is satisfied.

Figure 19:
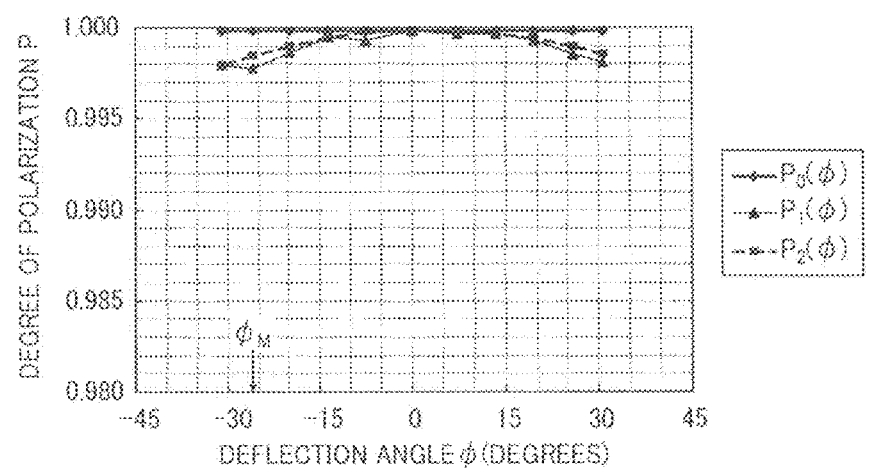
FIG. 19 is a diagram illustrating a measurement result of the third degree of polarization obtained by the use of the second type of polarization adjustment element.

FIG. 19 illustrates the measurement results of FIG. 17 and a measurement result of the degree of polarization $P_2(\Phi)$ obtained by the use of the polarization adjustment element of Type B. The value of the degree of polarization $P_2(\Phi_M)$ is approximately 0.9983. In this case, the relationship of the foregoing formula (2) is satisfied.

The relationship between the degree of polarization P and the ghost light intensity will now be described. When the polarization separation element separates a polarized light component in the major axis direction as the writing light, a polarized light component in the minor axis direction acts as the ghost light. In ideal linear polarization, the value of the polarized light component in the minor axis direction is 0, and therefore the ghost light is not generated.

If the value of the degree of polarization P is less than 1, the value of the polarized light component in the minor axis direction is more than 0, and the ghost light is generated. Herein, a ghost light intensity ratio R is obtained by the following formula (3).

$$R = (I_b/I_a) \times 100(\%) \quad (3)$$

The ghost light intensity ratio R corresponding to the deflection angle $\Phi_M$ is approximately 0.3103% when no polarization adjustment element is provided, approximately 0.2831% when the polarization adjustment element of Type A is provided, and approximately 0.2753% when the polarization adjustment element of Type B is provided. It is confirmed that providing the polarization adjustment element of Type A or Type B reduces the ghost light.

A second configuration of the polarization adjustment elements $21_1$ and $21_2$ will now be described. The second configuration of the polarization adjustment elements $21_1$ and $21_2$ is based on the major axis direction of the polarized light emitted from the polarization adjustment elements $21_1$ and $21_2$, instead of the degree of polarization P.

Description will be first made of a configuration based on the major axis direction of the polarized light emitted from the polarization adjustment element of Type A.

Herein, $\theta_0(\Phi)$ represents the angle formed between the plane S and the major axis direction of the polarized light at the time at which the scanning light is incident on the scanning lens, and $\theta_1(\Phi)$ represents the angle formed between the plane S and the major axis direction of the polarized light at the time at which the scanning light emitted from the scanning lens is incident on the polarization adjustment element. Further, $\theta_2(\Phi)$ represents the angle formed between the plane S and the major axis direction of the polarized light at the time at which the scanning light emitted from the polarization adjustment element is incident on the polarization separation element. Further, $\Phi_N$ represents the deflection angle corresponding to the maximum value of the difference between the angles $\theta_0(\Phi)$ and $\theta_1(\Phi)$.

Herein, the polarization adjustment element $21_1$ is configured such that at least one of the light beams LBa and LBb satisfies the following formula (4).

$$|\theta_0(\Phi_N)-\theta_1(\Phi_N)|>|\theta_0(\Phi_N)-\theta_2(\Phi_N)| \quad (4)$$

Further, the polarization adjustment element $21_2$ is configured such that at least one of the light beams LBc and LBd satisfies the above formula (4).

Herein, each of the polarization adjustment elements $21_1$ and $21_2$ functions to cause the angle between the plane S and the major axis direction of the polarized light having changed from the angle $\theta_0(\Phi)$ to the angle $\theta_1(\Phi)$ to approach the angle $\theta_0(\Phi)$ when the scanning light is incident on the corresponding one of the polarization separation elements $16_2$ and $16_2$. It is desirable to use the polarization adjustment element of Type A in a case where the polarization separation element at the subsequent stage is a wire grid element.

Figure 20:
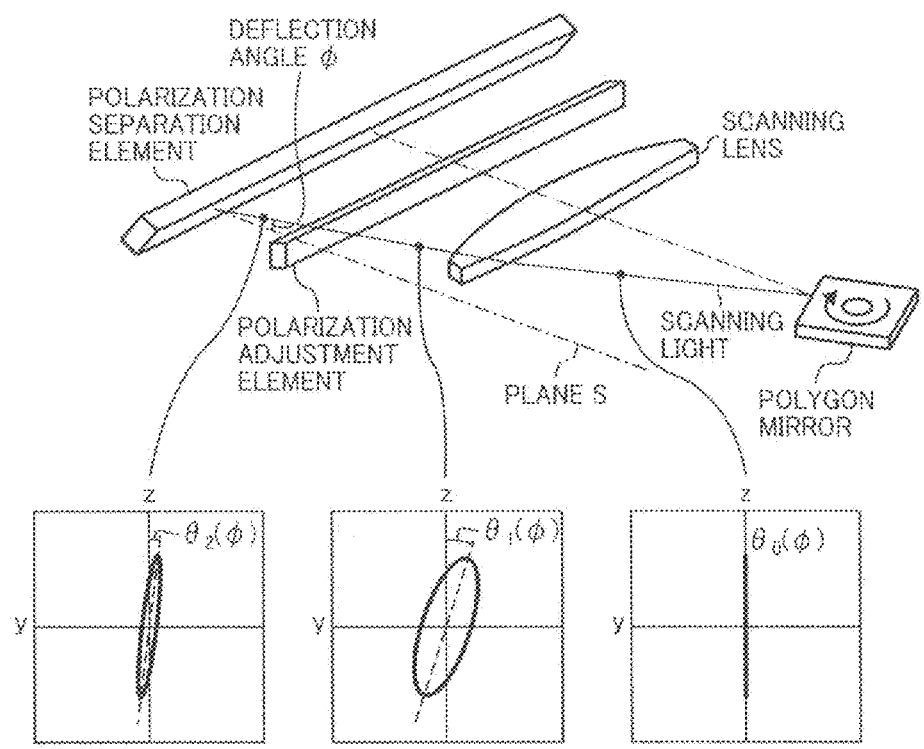
FIG. 20 is a diagram illustrating first to third angles between the plane and a major axis direction of a polarized light.

FIG. 20 illustrates a specific example of the angles $\theta_0(\Phi)$, $\theta_1(\Phi)$, and $\theta_2(\Phi)$. Herein, the light incident on the scanning lens is the vertically polarized light.

In FIG. 20, the angle $\theta_0(\Phi)$ is not substantially different from the corresponding angle of the vertically polarized light, i.e., the value of 0 degree. However, the angle $\theta_0(\Phi)$ may slightly change depending on the shape or material of the collimating lens or the cylindrical lens or the polarization dependence of the reflectance of the polygon mirror, for example. It is assumed in the following that the angle $\theta_0(\Phi)$ is 0 degree in the vertically polarized light and 90 degrees in the horizontally polarized light for the deflection angle $\Phi$ in the effective scanning area, unless otherwise specified.

It is highly possible that the angle $\theta_1(\Phi)$ is different from the angle $\theta_0(\Phi)$ owing to the birefringence in the scanning lens. The degree of the difference varies depending on the material or shape of the scanning lens and also on the deflection angle $\Phi$.

Figure 21:
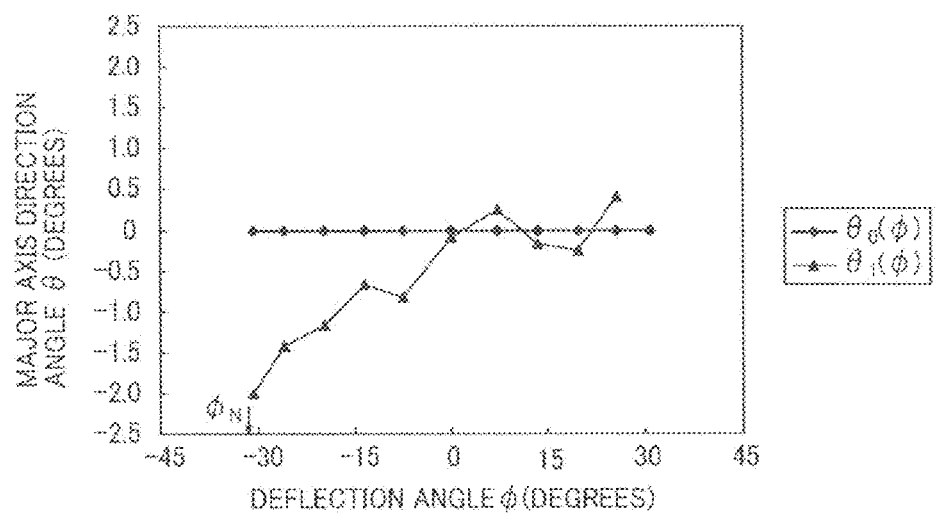
FIG. 21 is a diagram illustrating measurement results of the first and second angles.

FIG. 21 illustrates an example of measurement results of the angles $\theta_0(\Phi)$ and $\theta_1(\Phi)$ in a case where the vertically polarized light is incident on the scanning lens. The deflection angle $\Phi_N$ corresponding to the maximum value of the difference between the angles $\theta_0(\Phi)$ and $\theta_1(\Phi)$ is approximately −30.9 degrees. In this case, the angles $\theta_0(\Phi_N)$ and $\theta_1(\Phi_N)$ are approximately 0.00 degree and approximately −2.00 degrees, respectively.

Figure 22:
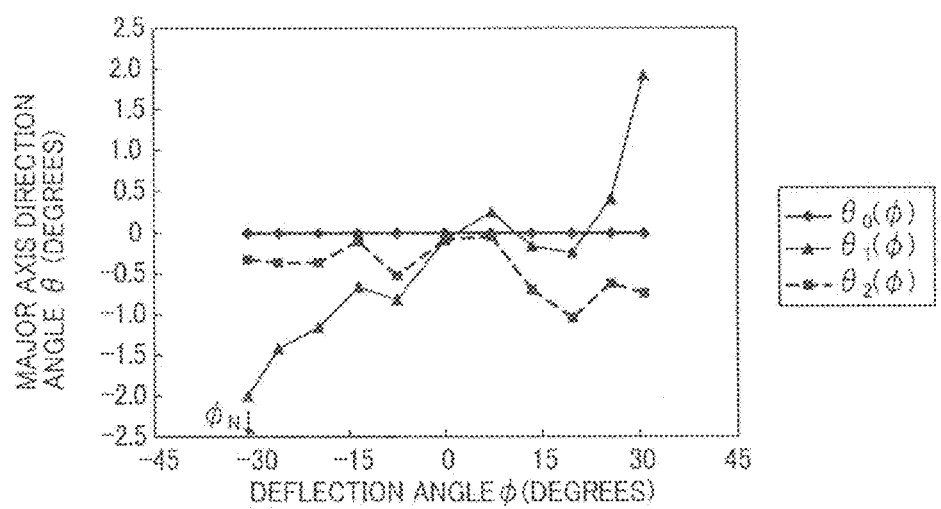
FIG. 22 is a diagram illustrating a measurement result of the third angle obtained by the use of the first type of polarization adjustment element.

FIG. 22 illustrates the measurement results of FIG. 21 and a measurement result of the angle $\theta_2(\Phi)$ obtained by the use of the polarization adjustment element of Type A. The angle $\theta_2(\Phi_N)$ is approximately −0.337 degrees. In this case, the relationship of the foregoing formula (4) is satisfied.

The relationship between the major axis direction of the polarized light and the ghost light intensify will now be described. When the polarization separation element separates a polarized light component parallel to the plane S as the writing light, the light intensity of the writing light is represented as $\cos^2\theta_2(\Phi_N)$, and the ghost light intensity ratio R is expressed by the following formula (5) transformed from the foregoing formula (3).

$$R=\sin^2\theta_2(\Phi_N)/\cos^2\theta_2(\Phi_N) \quad (5)$$

Accordingly, the ghost light intensity ratio R corresponding to the deflection angle $\Phi_N$ is approximately 0.122% when no polarization adjustment element is provided, and approximately 0.00345% when the polarization adjustment element of Type A is provided. It is confirmed that providing the polarization adjustment element of Type A reduces the ghost light.

Description will now be made of a configuration based on the major axis direction of the polarized light emitted from the polarization adjustment element of Type B.

Herein, $\theta_3(\Phi)$ represents, when a linearly polarized light having the same wavelength as the wavelength of the light beam is incident on the polarization separation element at the deflection angle $\Phi_N$, the angle formed between the plane S and the polarization direction of the linearly polarized light corresponding to a maximum extinction ratio.

The polarization adjustment element of Type B is configured to satisfy the following formula (6).

$$|\theta_3(\Phi_N)-\theta_2(\Phi_N)+\theta_1(\Phi_N)|>|\theta_3(\Phi_N)-\theta_2(\Phi_N)+\theta_0(\Phi_N)| \quad (5)$$

Figure 23:
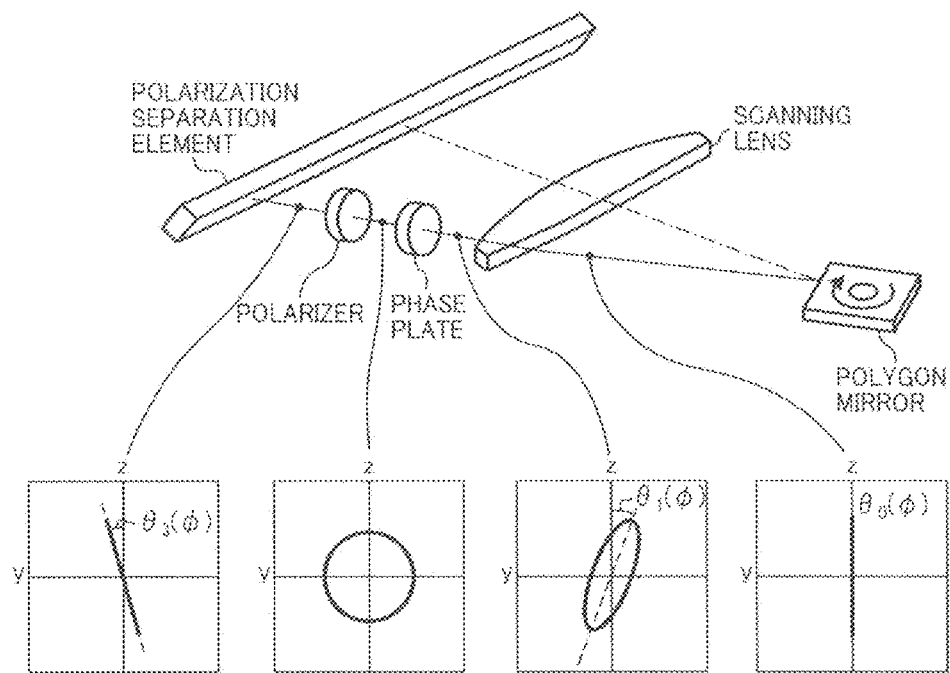
FIG. 23 is a diagram illustrating an example of setup for identifying a fourth angle between the plane and the major axis direction of the polarized light.

FIG. 23 illustrates an example of setup for identifying the angle $\theta_3(\Phi)$. In this example, the light incident on the scanning lens is the vertically polarized light. The light is incident on the scanning lens from the polygon mirror at the deflection angle $\Phi_N$. The light emitted from the scanning lens is elliptically polarized. To convert the elliptically polarized light into a substantially completely circularly polarized light, a phase plate is provided at a stage subsequent to the scanning lens. Further, a polarizer is rotatably provided at a stage subsequent to the phase plate, and the linearly polarized light emitted from the polarizer is incident on the polarization separation element. While the polarizer is rotated, the intensity of the light transmitted through the polarization separation element is measured by a not-illustrated detector, such as a power meter. Then, the rotation angle of the polarizer corresponding to the minimum value of the output from the detector is calculated. The angle $\theta_3(\Phi)$ is perpendicular to the rotation angle. If the light incident on the scanning lens is the horizontally polarized light, the intensity of the light reflected by the polarization separation element is measured by the detector.

Herein, if the light emitted from the light source is the horizontally polarized light, the polarization adjustment element functions to cause the major axis direction of the polarized light changed in angle from the angle $\theta_0(\Phi)$ to the angle $\theta_1(\Phi)$ during the transmission of the light through the scanning lens to approach a direction perpendicular to the polarization separation surface of the polarization separation element when the light is incident on the polarization separation element. Further, if the light emitted from the light source is the vertically polarized light, the polarization adjustment element functions to cause the major axis direction of the polarized light changed in angle from the angle $\theta_0(\Phi)$ to the angle $\theta_1(\Phi)$ during the transmission of the light through the scanning lens to approach a direction parallel to the polarization separation surface of the polarization separation element when the light is incident on the polarization separation element. It is desirable to use the polarization adjustment element of Type B in a case where the polarization separation element at the subsequent stage is a dielectric multilayer film element.

Figure 24:
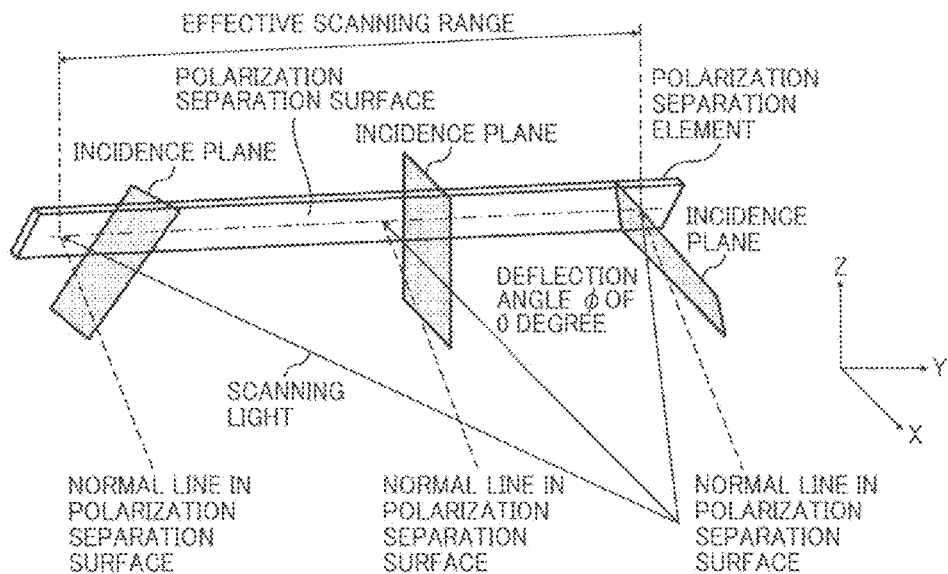
FIG. 24 is a diagram illustrating an incidence plane of a scanning light incident on a polarization separation element.

As illustrated in FIG. 24, the incidence plane in the polarization separation element tilts in accordance with the direction of travel of the scanning light. For convenience, a tilt angle relative to the incidence plane corresponding to the deflection angle $\theta$ of 0 degree will be hereinafter referred to as the incidence plane rotation angle. If the incident surface of the polarization separation element is the polarization separation surface, the angle $\theta_3(\Phi)$ is equivalent to the incidence plane rotation angle. Meanwhile, if the incident surface of the polarization separation element is not the polarization separation surface but is formed by a planar substrate or a prism substrate, for example, the angle $\theta_3(\Phi)$ is not equivalent to the incidence plane rotation angle. For the purpose of clarity, it is assumed in the following description that the incident surface of the polarization separation element is the polarization separation surface. Further, the incidence plane rotation angle depends on not only the deflection angle $\Phi$ but also the angle formed between the deflection plane and the normal line of the light incidence position in the incident surface (i.e., the polarization separation surface in this case) of the polarization separation element.

Figure 25:
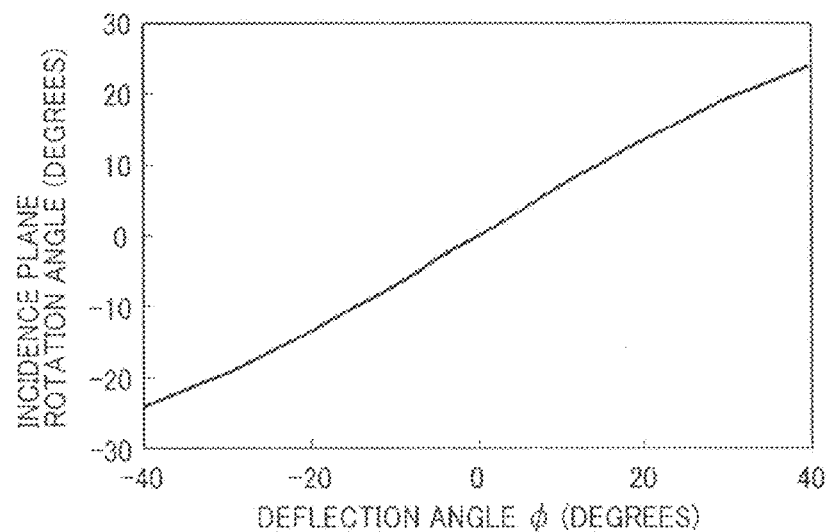
FIG. 25 is a diagram illustrating the relationship between the deflection angle and an incidence plane rotation angle.

FIG. 25 illustrates a calculation result of the relationship between the incidence plane rotation angle and the deflection angle $\Phi$ in a case where the angle formed between the deflection plane and the normal line of the light incidence position in the incident surface (i.e., the polarization separation surface in this case) of the polarization separation element is 55 degrees. If the incident light is the vertically polarized light, it is ideal to set the angle $\theta_2(\Phi)$ to be rotated in the same rotation direction as the rotation direction of the incidence plane rotation angle by the same angle as the incidence plane rotation angle. Further, the angle $\theta_3(\Phi)$ is approximately −19.8 degrees, and the deflection angle $\Phi_N$ is approximately −30.9 degrees.

Figure 26:
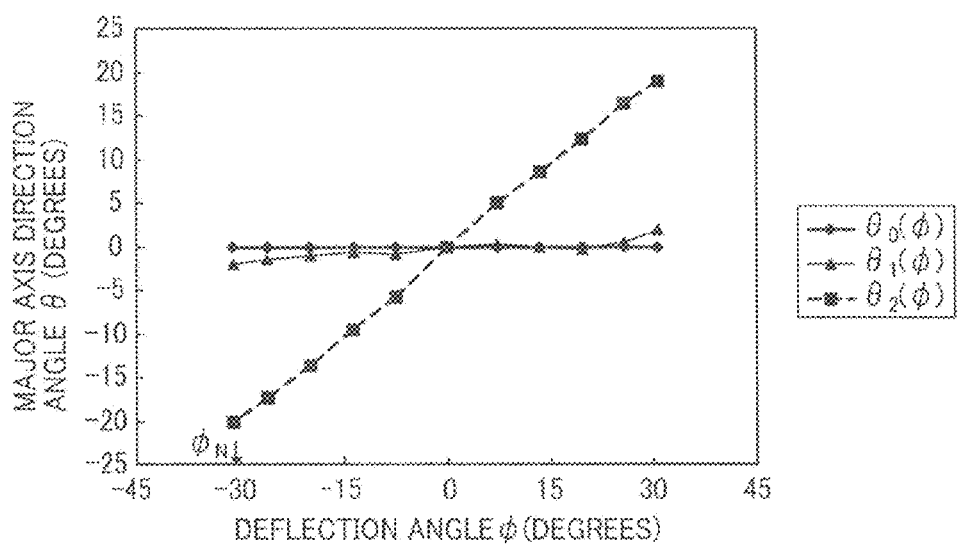
FIG. 26 is a diagram illustrating a measurement result of the third angle obtained by the use of the second type of polarization adjustment element.

FIG. 26 illustrates a measurement result of the angle $\theta_2(\Phi)$ in a case where the polarization adjustment element of Type B is provided at a stage preceding the polarization separation element having the result of FIG. 25. The angles $\theta_0(\Phi_N)$, $\theta_1(\Phi_N)$, and $\theta_2(\Phi_N)$ are approximately 0.00 degree, approximately −2.00 degrees, and approximately −20.1 degrees, respectively. In this case, relationships $|\theta_3(\Phi_N)-\theta_2(\Phi_N)+\theta_1(\Phi_N)|=1.7$ degrees and $|\theta_3(\Phi_N)-\theta_2(\Phi_N)+\theta_0(\Phi_N)|=0.3$ degrees hold, and the relationship of the foregoing formula (6) is satisfied. Further, as illustrated in FIG. 26, the angle $\theta_2(\Phi)$ has a similar tendency to the tendency illustrated in FIG. 25.

The relationship between the major axis direction of the polarized light and the ghost light intensity will now be described. In the polarization separation element, when $\Delta\theta_2(\Phi)$ represents the difference between the incidence plane rotation angle and the angle $\theta_2(\Phi)$ corresponding to the deflection angle $\Phi$, and when a polarized light component parallel to the incidence plane is separated as the writing light, the light intensity of the writing light is represented as $\cos^2[\Delta\theta_2(\Phi)]$, and the ghost light intensity is represented as $\sin^2[\Delta\theta_2(\Phi)]$.

When the deflection angle $\Phi_N$ is −30.9 degrees, the angle $\theta_1(\Phi_N)$, the angle $\theta_2(\Phi_N)$, and the incidence plane rotation angle are approximately −2.00 degrees, approximately −20.1 degrees, and approximately −19.8 degrees, respectively. If no polarization adjustment element is provided, the difference $\Delta\theta_2(\Phi_N)$ is calculated as $-19.8-(-2.00)$, i.e., approximately −17.8 degrees, and the ghost light intensity ratio R represented as $\sin^2[\Delta\theta_2(\Phi)]$ is approximately 9.35%. Meanwhile, if the polarization adjustment element is provided, the difference $\Delta\theta_2(\Phi_N)$ is calculated as $-19.8-(-20.1)$, i.e., approximately −0.3 degrees, and the ghost light intensity ratio R represented as $\sin^2[\Delta\theta_2(\Phi)]$ is approximately 0.003%.

Related-art devices, such as the optical scanning devices described above in the Background section of this specification, for example, perform polarization adjustment without consideration of the angle $\theta_1(\Phi_N)$. In this case, the difference $\Delta\theta_2(\Phi_N)$ is approximately −2.30 degrees due to the addition of the difference $\theta_1(\Phi_N)$ of approximately −2.00 degrees. The ghost light intensity ratio R in this case is approximately 0.16%. Accordingly, it is confirmed that the effect of the polarization adjustment element is substantial.

Figure 27:
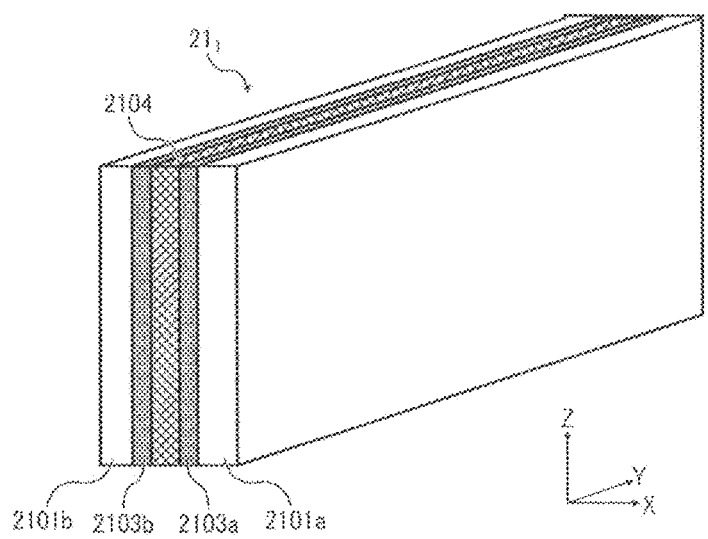
FIG. 27 is a diagram illustrating a configuration of elements forming a liquid crystal element.

Description will now be made of a structural configuration example of the polarization adjustment elements $21_1$ and $21_2$. As illustrated in an example of FIG. 27, the polarization adjustment element $21_1$ includes a liquid crystal element including, for example, a pair of transparent substrates $2101a$ and $2101b$, a nematic liquid crystal layer $2104$ held between the transparent substrates $2101a$ and $2101b$, and oriented films $2103a$ and $2103b$ provided at respective interfaces between the nematic liquid crystal layer $2104$ and transparent substrates $2101a$ and $2101b$.

Figure 28:
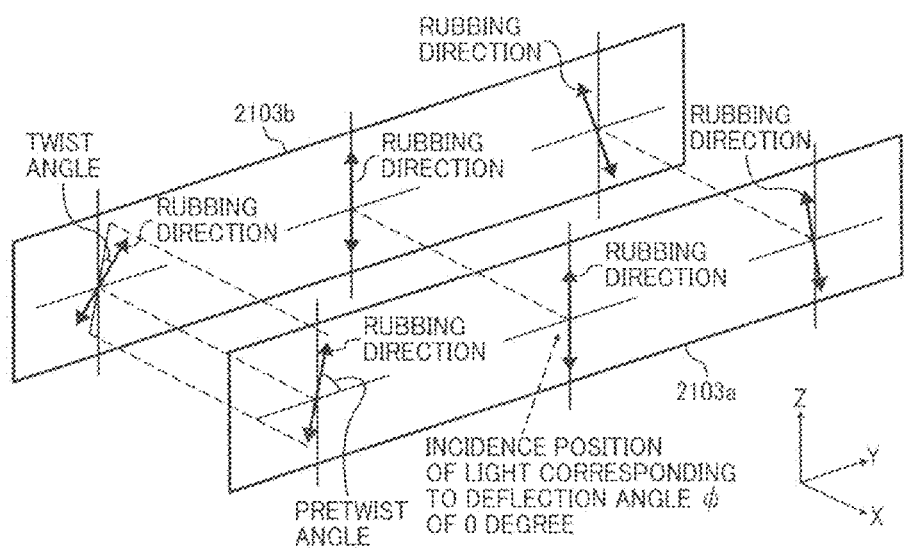
FIG. 28 is a diagram illustrating an example of setting of a pretwist angle and a twist angle in the liquid crystal element.

FIG. 28 illustrates an example of the orientation direction in an orientation treatment, such as a rubbing treatment, performed on the oriented films $2103a$ and $2103b$ of the liquid crystal element. Liquid crystal molecules have a characteristic of having a major axis direction oriented along the rubbing direction at an interface of an oriented film. In the following, the angle formed between the Y-axis direction and the major axis direction of the liquid crystal molecules in the oriented film $2103a$ on the light incident side will be referred to as the pretwist angle. The major axis direction of the liquid crystal molecules is adjustable by a treatment, such as a rubbing treatment and a light orientation treatment, performed on the oriented film.

At a position at which a light is perpendicularly incident on the liquid crystal element, i.e., at the position corresponding to the deflection angle $\Phi$ of 0 degree, the major axis direction of the liquid crystal molecules is set to be parallel or perpendicular to the polarization direction of the incident light. In FIG. 28, the major axis direction of the liquid crystal molecules is set such that the pretwist angle and the twist angle are 90 degrees and 0 degree, respectively, at the position corresponding to the deflection angle $\Phi$ of 0 degree. This is because, in the scanning light having the deflection angle $\Phi$ of 0 degree, the degree of polarization P and the major axis direction of the polarized light are substantially unchanged before and after the emission of the scanning light from the scanning lens (see FIGS. 17 and 21). Further, the rubbing direction is set such that both the pretwist angle and the twist angle continuously change in accordance with the increase in the distance in the Y-axis direction from the position corresponding to the deflection angle $\Phi$ of 0 degree.

Figure 29:
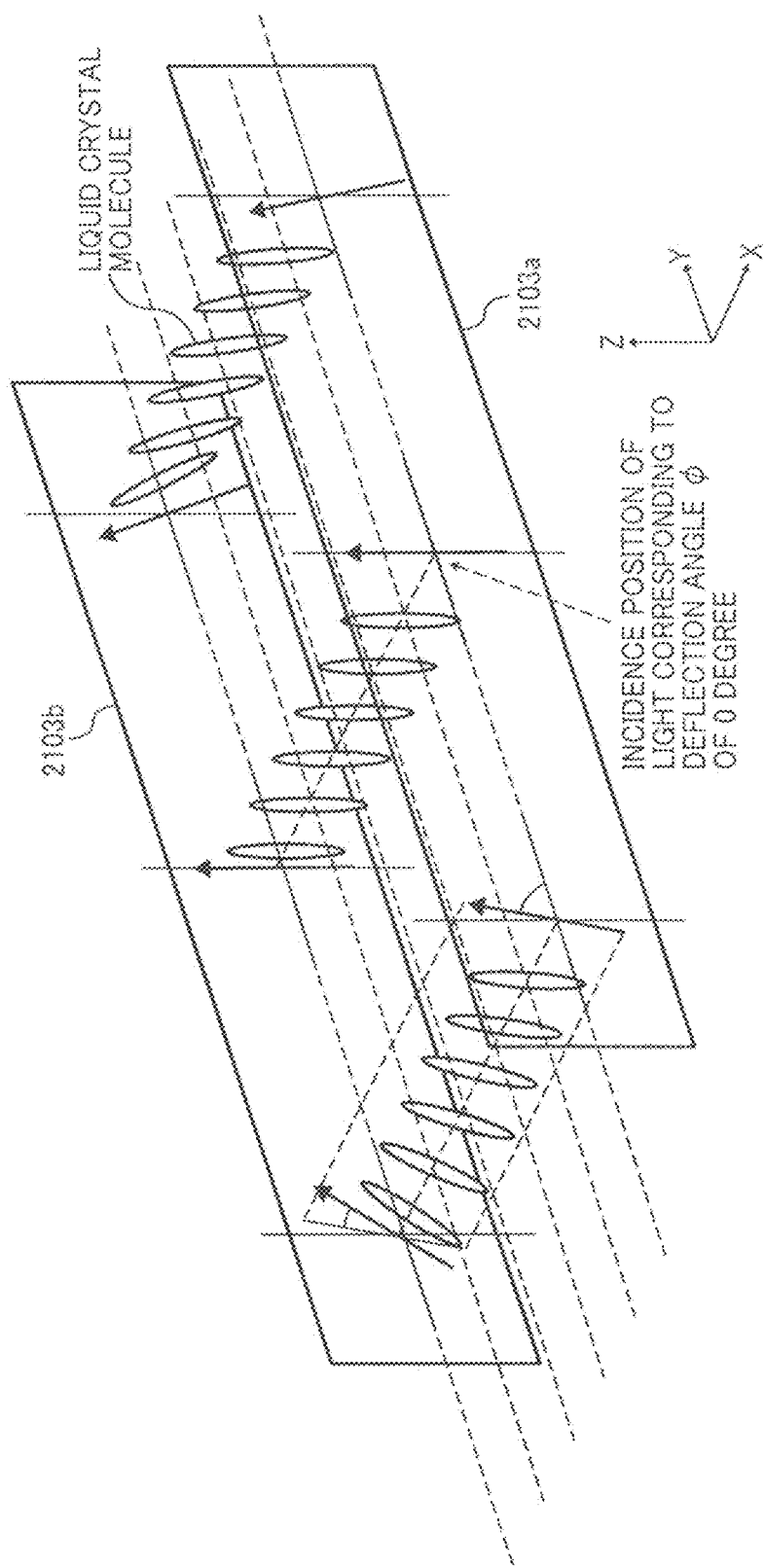
FIG. 29 is a diagram illustrating the orientation of liquid crystal molecules in the liquid crystal element.

FIG. 29 illustrates an example of the direction of the liquid crystal molecules in the nematic liquid crystal layer $2104$ held between the oriented films $2103a$ and $2103b$. In FIG. 29, broken lines indicate positions in the thickness direction of the nematic liquid crystal layer $2104$, i.e., in the X-axis direction.

Figure 30:
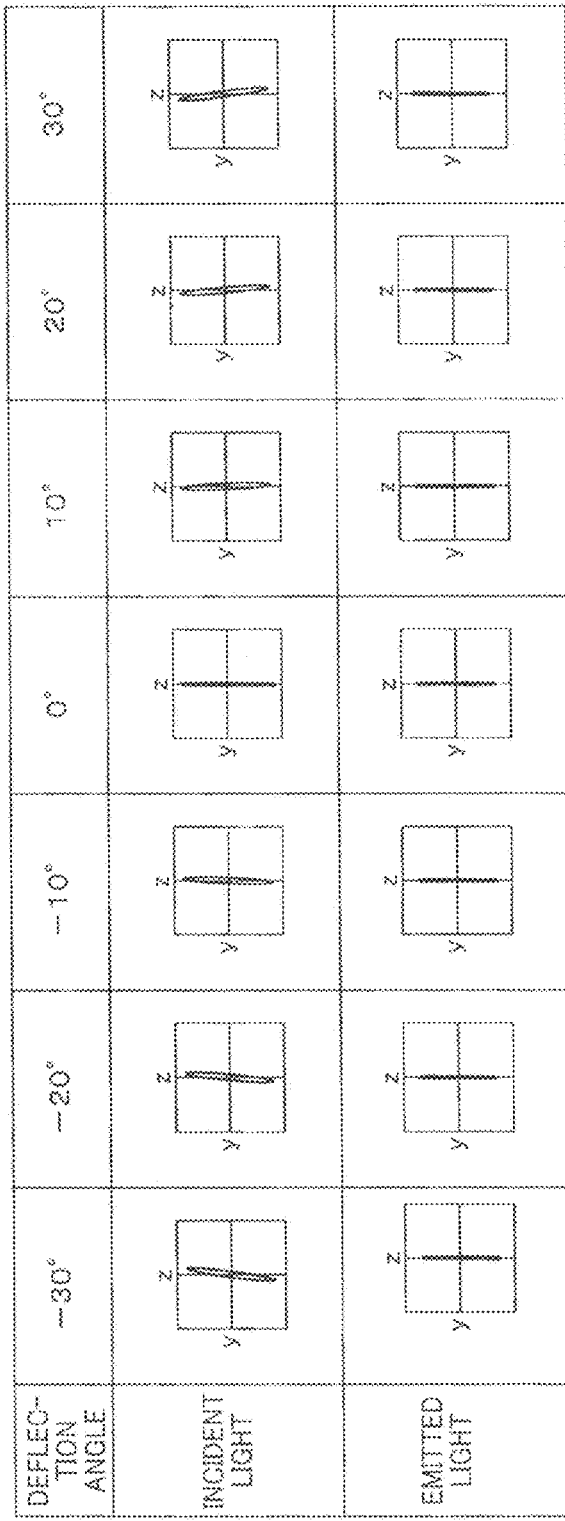
FIG. 30 is a diagram illustrating polarization states of an incident light and an emitted light of the first type of polarization adjustment element.
Figure 31:
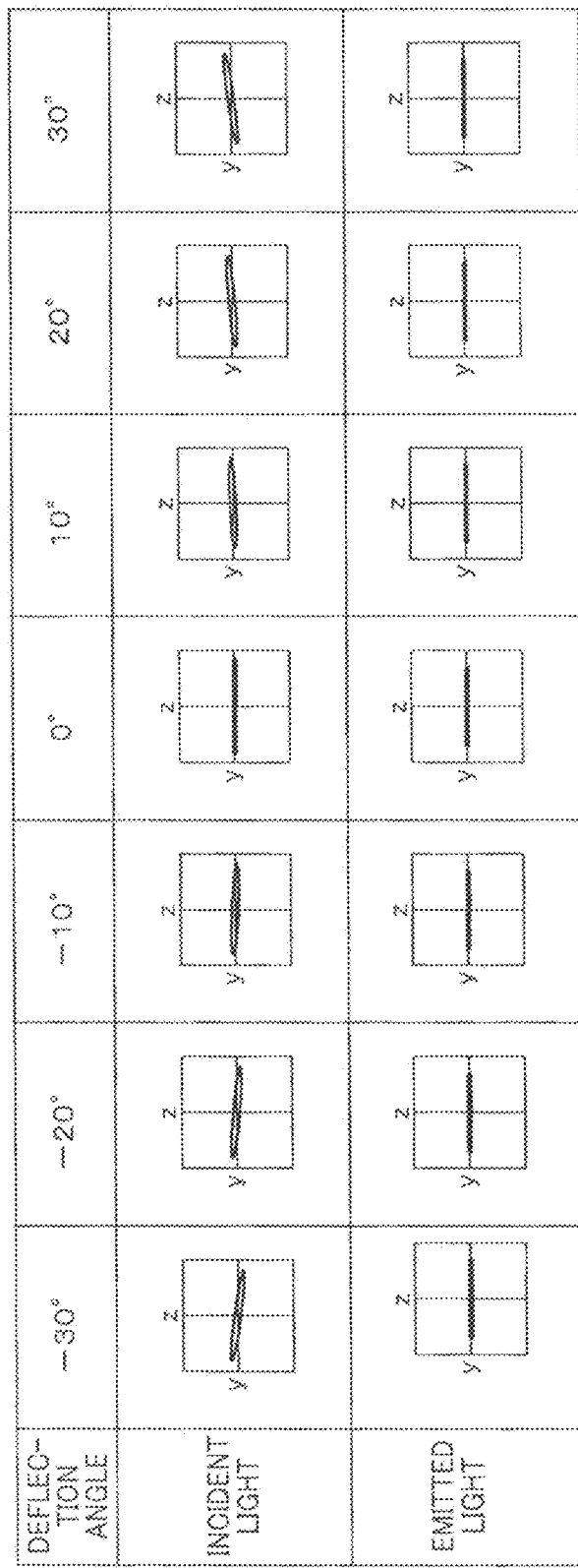
FIG. 31 is another diagram illustrating polarization states of an incident light and an emitted light of the first type of polarization adjustment element.
Figure 32:
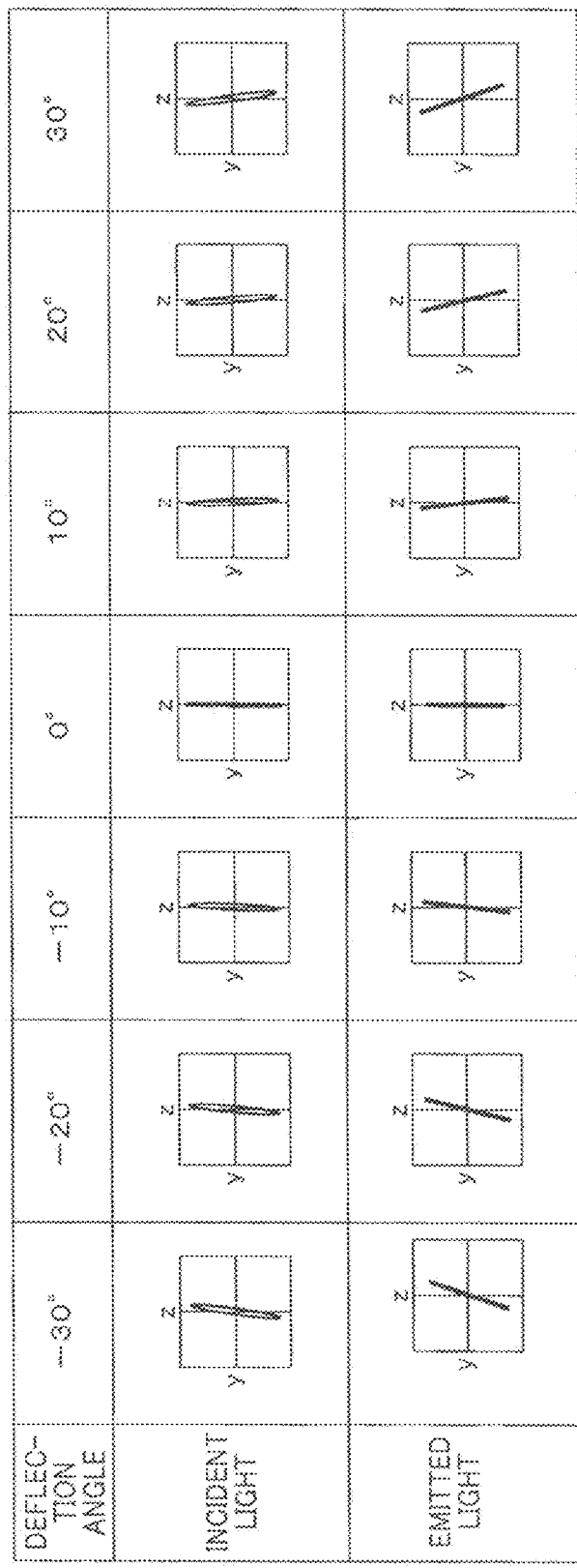
FIG. 32 is a diagram illustrating polarization states of an incident light and an emitted light of the second type of polarization adjustment element.
Figure 33:
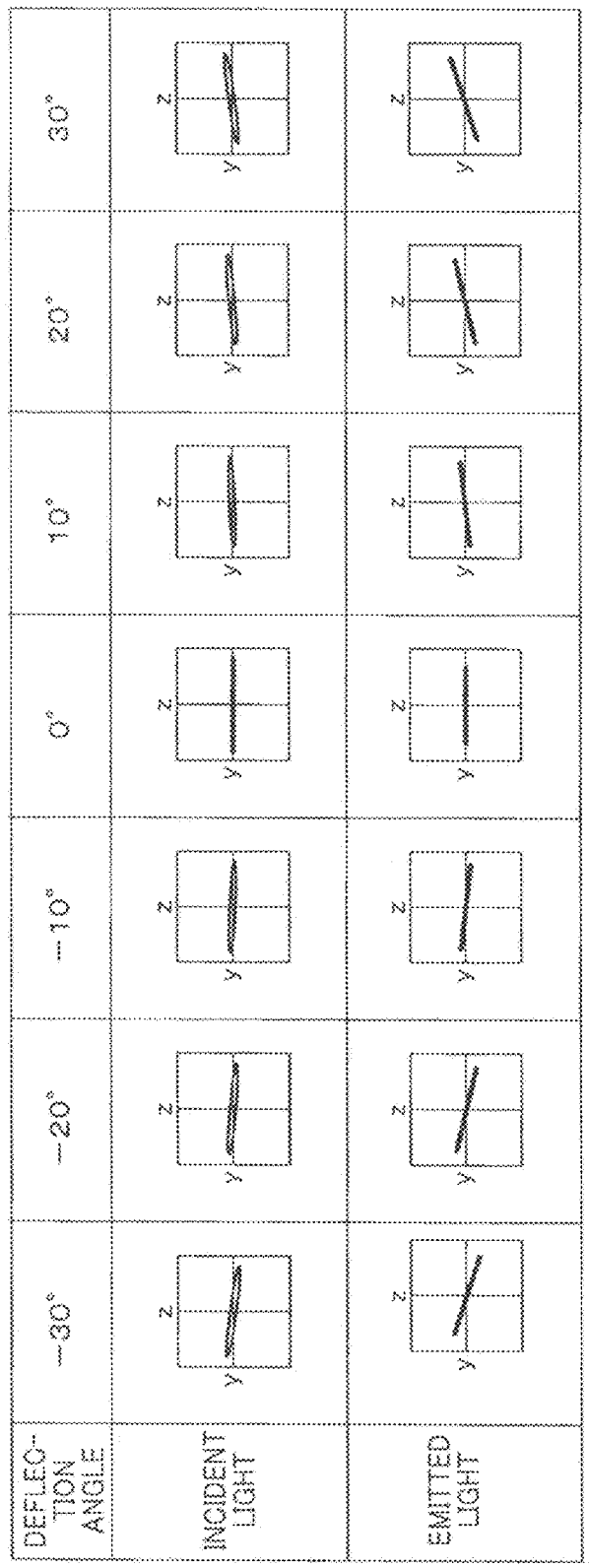
FIG. 33 is another diagram illustrating polarization states of an incident light and an emitted light of the second type of polarization adjustment element.

Respective rotation directions of the pretwist angle and the twist angle at each light incidence position in the liquid crystal element are set such that the electrical field vector of the light incident on the polarization separation element corresponds to linear polarization in a predetermined direction. That is, in the polarization adjustment element of Type A, polarization adjustment as illustrated in FIGS. 30 and 31 is performed in accordance with the deflection angle $\Phi$. Further, in the polarization adjustment element of Type B, polarization adjustment as illustrated in FIGS. 32 and 33 is performed in accordance with the deflection angle $\Phi$.

The above-described pretwist angle and twist angle are preferably derived by calculating a Jones matrix of the liquid crystal element in which, when a measurement value representing the polarization state of the light incident on the polarization adjustment element and a setting value representing the polarization state of the light emitted from the polarization adjustment element are expressed by Jones vectors, the Jones vector of the emitted light is the closest to the setting value. This Jones matrix representation of the liquid crystal element is described in Colin Soutar and Kanghua Lu, "Determination of the physical properties of an arbitrary twisted-nematic liquid crystal cell," Optical Engineering, Vol. 33, No. 8, pages 2704 to 2712 (1994). An optimal solution may be derived by the use of a commercially available simulator for a liquid crystal element.

Further, although the pretwist angle and the twist angle are changed along the Y-axis direction in the present example, the tilt angle of the liquid crystal molecules may be changed. In that case, the configuration is modified such that the pretilt angle of the oriented film is changed in accordance with the location, or that the liquid crystal element itself is slightly tilted by an electrical field.

If the liquid crystal element is tilted by an electrical field, voltages may be applied to electrodes arranged such that the electrical field intensity changes in accordance with the position in the Y-axis direction, or the liquid crystal element may be hardened in a tilted state while the liquid crystal molecules are applied with an external electrical field.

The continuous change of the pretwist angle and the twist angle is obtainable by bringing a transparent plate with an oriented film into contact with a rotating rubbing cloth while changing the posture of the transparent plate relative to the rubbing cloth during the rubbing treatment on the oriented film.

Although the above description has been made of the liquid crystal element used in the polarization adjustment element $21_1$, a liquid crystal element used in the polarization adjustment element $21_2$ is also manufacturable in a similar manner.

With the use of the liquid crystal element in the polarization adjustment element, the manufacturing cost is kept relatively low, even if the area or length of the device is increased.

Further, the polarization adjustment element performs polarization adjustment in consideration of the change in polarization state due to an optical component provided at a stage preceding the scanning lens. Further, although the vertically polarized light and the horizontally polarized light are used as the light beams emitted from the light sources, the light sources are allowed to emit a light beam having an inclined polarization direction or an elliptically polarized light beam, provided that the adjustment by the polarization adjustment element is performed. In this case, the degree of selection freedom of optical elements is increased, and the shape tolerance and the arrangement tolerance of optical elements are relaxed.

Description will now be made of a polarization separation element preferred to be used in combination with the polarization adjustment element of Type A (hereinafter also referred to as the polarization separation element of Type A).

The polarization separation element of Type A has a polarization separation surface formed by a wire grid. The polarization separation surface reflects a polarized light component parallel to the direction of lines of the wire grid, and transmits therethrough a polarized light component perpendicular to the direction of the lines of the wire grid. Therefore, the direction of the lines of the wire grid is set to be parallel to the main scanning corresponding direction. Accordingly, the polarization separation surface transmits therethrough the vertically polarized light, and reflects the horizontally polarized light.

Figure 34A:
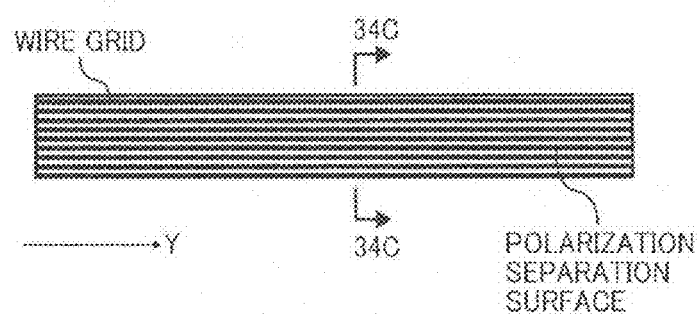
FIGS. 34A to 34C are diagrams illustrating a wire grid element.
Figure 34B:
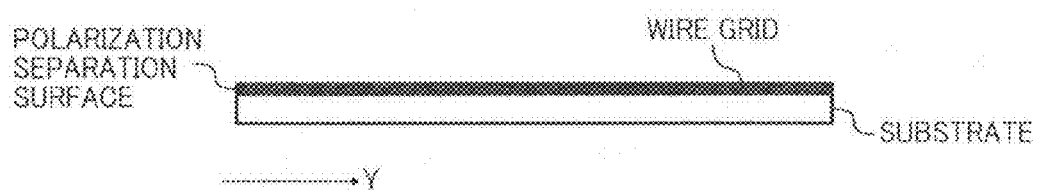
Figure 34C:
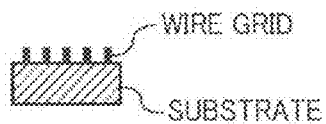

FIGS. 34A to 34C illustrate a configuration example of the wire grid. The wire grid is a microstructured grid formed on a plate-shaped substrate and having a grid pitch smaller than the wavelength of the incident light. FIG. 34C is a cross-sectional view taken along a 34C-34C line in FIG. 34A.

For example, the wire grid has a grid pitch of approximately 0.15 µm, a duty ratio (i.e., the grid width divided by the grid pitch) of approximately 50%, and a grid depth of approximately 0.05 µm. Further, a highly conductive material, such as aluminum, silver, or platinum, is selected as a wire material, and a transparent material, such as glass or hard plastic, is selected to form the substrate.

On the optical path of the light beam transmitted through or reflected by the polarization separation element, a polarizer may be additionally provided which has a transmission axis corresponding to the polarization direction of the light beam. With this polarizer, the ghost light is further suppressed.

Figure 35:
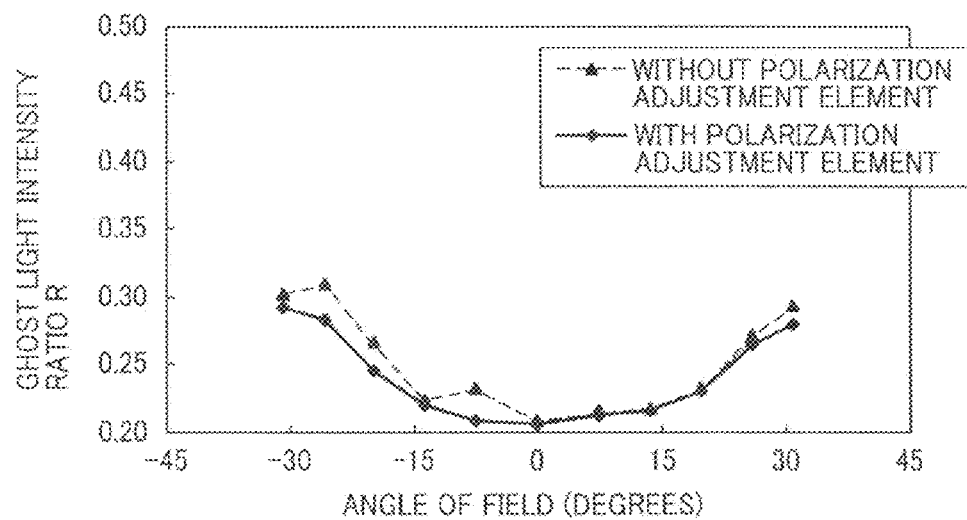
FIG. 35 is a diagram illustrating an effect of the polarization adjustment element in a case where the polarization separation element has a polarization separation surface formed by a wire grid.

FIG. 35 illustrates an example of a measurement result of the ghost light intensity ratio R in a case where the polarization adjustment element of Type A and the polarization separation element of Type A formed by the wire grid element are used in combination. If there is no polarization adjustment element, the polarization state of the light beam incident on the polarization separation element of Type A is degraded, and thus the ghost light intensity ratio R is relatively high. Meanwhile, the combined use of the polarization separation element of Type A with the polarization adjustment element of Type A results in an overall reduction in the ghost light intensity ratio R.

Description will now be made of a polarization separation element preferred to be used in combination with the polarization adjustment element of Type B (hereinafter also referred to as the polarization separation element of Type B).

Figure 36:
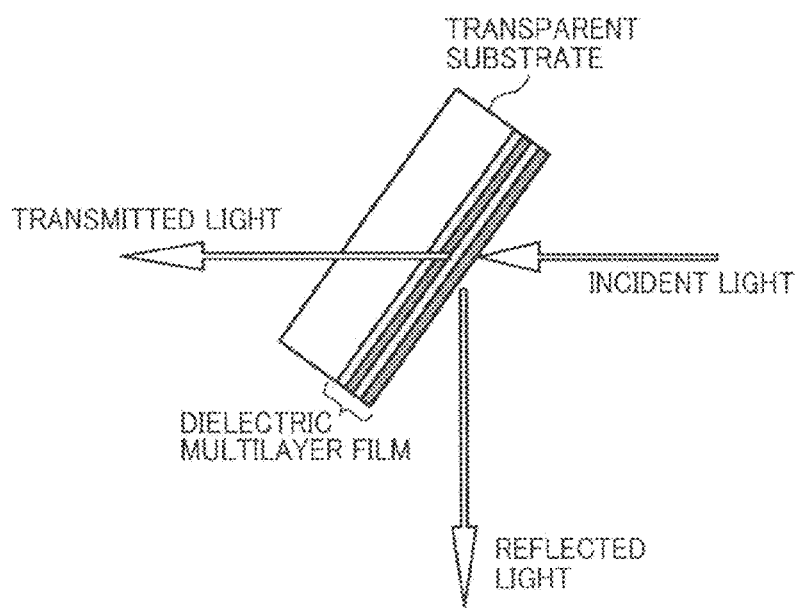
FIG. 36 is a diagram illustrating a polarization separation element having a polarization separation surface formed by a dielectric multilayer film.
Figure 37:
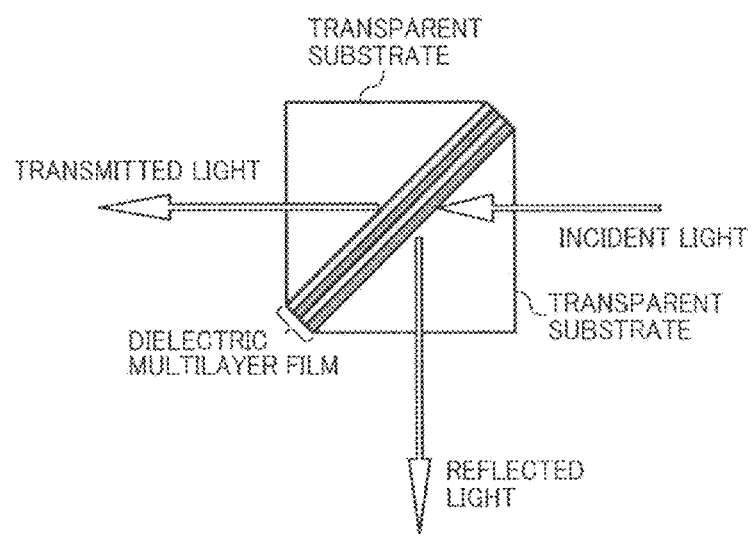
FIG. 37 is a diagram illustrating another polarization separation element having a polarization separation surface formed by a dielectric multilayer film.

The polarization separation element of Type B has a polarization separation surface formed by a dielectric multilayer film. The polarization separation surface, which is supported by a transparent substrate made of glass or transparent resin, transmits therethrough a p-polarized light and reflects an s-polarized light. The shape of the transparent substrate includes, for example, a plate shape illustrated in FIG. 36 and a prism shape illustrated in FIG. 37. The plate-shaped transparent substrate is simpler in structure and manufactured with fewer manufacturing processes than the prism-shaped transparent substrate, and thus is manufacturable at relatively low cost. Meanwhile, the prism-shaped transparent substrate equalizes the optical path length of the reflected light and the optical path length of the transmitted light, and does not cause a bend of the transmitted light of the scanning light according to the deflection angle Φ. Therefore, the prism-shaped transparent substrate makes it easier to secure the optical performance.

Designing of the thickness of the dielectric multilayer film may be performed by the use of an optical simulator in which the refractive index of the dielectric material to be used, the range of the deflection angle Φ requiring polarization separation, and the wavelength of the incident light are used as parameters. The dielectric material includes, for example, titanium dioxide $TiO_2$ as a high refractive material and silicon dioxide $SiO_2$ as a low refractive material.

Figure 38:
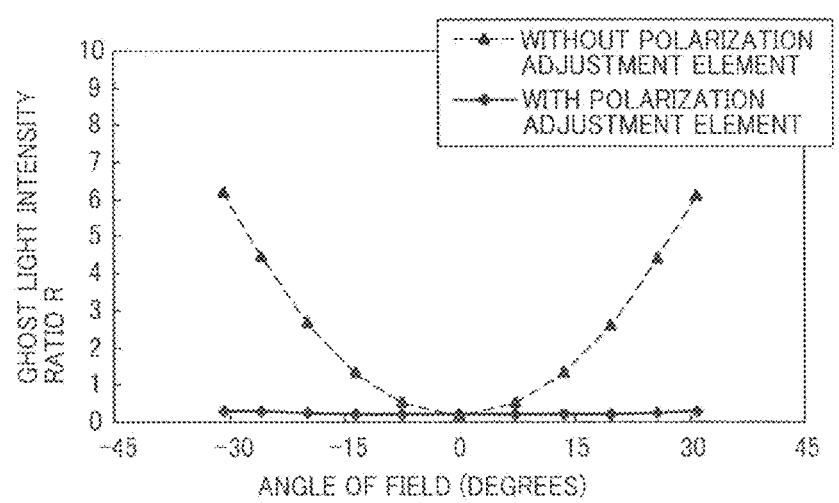
FIG. 38 is a diagram illustrating an effect of the polarization adjustment element in a case where the polarization separation element has a polarization separation surface formed by a dielectric multilayer film.

FIG. 38 illustrates an example of a measurement result of the ghost light intensity ratio R in a case where the polarization adjustment element of Type B and the polarization separation element of Type B are used in combination. If there is no polarization adjustment element, the polarization state of the light beam incident on the polarization separation element of Type B is degraded, and thus the ghost light intensity ratio R is relatively high. Meanwhile, the combined use of the polarization separation element of Type B with the polarization adjustment element of Type B results in an overall reduction in the ghost light intensity ratio R.

As described above, the optical scanning device 2010 according to the present embodiment includes, for example, the two light source units LU1 and LU2, the two cylindrical lenses $12_1$ and $12_2$, the polygon mirror 14, the two scanning lenses $15_1$ and $15_2$, the two polarization adjustment elements $21_1$ and $21_2$, the two polarization separation elements $16_1$ and $16_2$, the two reflecting mirrors $17_1$ and $17_2$, the four turning mirrors 18a, 18b, 18c, and 18d, and the not-illustrated scanning control device.

Further, with the use of the polarization adjustment elements $21_1$ and $21_2$, the polarization separation performance of the polarization separation elements $16_1$ and $16_2$ is improved, and the generation of the ghost light, i.e., optical noise is reduced.

Further, the scanning lens $15_1$ and the polarization separation element $16_1$ are shared by two of the image forming stations, and the scanning lens $15_2$ and the polarization separation element $16_2$ are shared by the remaining two of the image forming stations. Accordingly, the device size is reduced. Consequently, the generation of the ghost light is stably suppressed without an increase in cost and device size.

Further, the color printer 2000 according to the present embodiment includes the optical scanning device 2010, and thus forms a high-quality image without causing an increase in cost and apparatus size.

In the above-described embodiment, the foregoing liquid crystal element may be replaced by a polymer wave plate in which the stretching direction of a stretched film is changed in accordance with the light incidence angle or by a structural birefringent wave plate in which the vapor deposition direction and the vapor deposition angle of an oblique vapor deposition film are changed in accordance with the light incidence angle. In this case, if a quarter-wave plate and a half-wave plate are used in combination to cause the quarter-wave plate to convert an elliptically polarized light into a linearly polarized light and cause the half-wave plate to rotate the converted linearly polarized light in a predetermined direction, the wave plate has an effect similar to the effect of the foregoing liquid crystal element.

Further, in the above-described embodiment, each of the polarization separation elements $16_1$ and $16_2$ and the corresponding one of the polarization adjustment elements $21_1$ and $21_2$ may be integrated together, as illustrated in an example of FIG. 39. In this case, the number of interfaces on the optical path is reduced, and wavefront aberration is reduced. Further, the sharing of components results in a reduction in cost. Further, the process of assembling the elements into the optical scanning device 2010 and a process of adjusting the elements are simplified.

In the above-described embodiment, each of the light sources $10a_1$ to $10d_1$ includes one light emitting portion. The configuration, however, is not limited thereto. For example, each of the light sources $10a_1$ to $10d_1$ may include a plurality of semiconductor lasers, or may include a semiconductor laser array having a plurality of light emitting portions.

Further, in the above-described embodiment, the toner images are transferred from the photoconductor drums 2030a to 2030d to the recording sheet via the transfer belt 2040. The configuration, however, is not limited thereto. For example, the toner images may be directly transferred to the recording sheet.

Further, in the above-described embodiment, the image forming apparatus is the color printer 2000 including the four photoconductor drums 2030a to 2030d. However, the image forming apparatus is not limited thereto. For example, the image forming apparatus may be a printer including two photoconductor drums or a multicolor printer additionally using supplemental colors.

Further, the image forming apparatus may use, as an image carrier, a color developing medium which develops colors with the thermal energy of the beam spot, such as a positive photographic paper. In this case, a visible image is directly formed on the image carrier by optical scanning.

Further, in the above-described embodiment, the optical scanning device 2010 is used in a printer. However, the optical scanning device 2010 is also preferably applicable to an image forming apparatus other than the printer, such as a copier, a facsimile machine, or a multifunction machine having the functions of these apparatuses, for example.

The above-described embodiments are illustrative and do not limit the present invention. Thus, numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. It is therefore to be understood that, within the scope of the appended claims, the disclosure of the present invention may be practiced otherwise than as specifically described herein.

What is claimed is:

1. An optical scanning device which separately scans a plurality of scan target surfaces in a first direction with light, the optical scanning device comprising:
  a light source unit configured to emit a first light beam and a second light beam mutually different in polarization state;
  an optical deflector configured to rotate around an axis parallel to a second direction perpendicular to the first direction, and deflect the first light beam and the second light beam emitted from the light source unit;
  an imaging optical element provided on respective optical paths of the first light beam and the second light beam deflected by the optical deflector;
  a polarization adjustment element provided on the optical paths of the first light beam and the second light beam transmitted through the imaging optical element, and configured to correct respective changes in polarization state of the first light beam and the second light beam occurring during the transmission of the first light beam and the second light beam through the imaging optical element; and
  a polarization separation element provided on the optical paths of the first light beam and the second light beam emitted from the polarization adjustment element, and configured to separate the first light beam and the second light beam from each other.

2. The optical scanning device according to claim 1, wherein at least one of the first light beam and the second light beam satisfies a relationship $|\theta_3(\Phi_N)-\theta_2(\Phi_N)+\theta_1(\Phi_N)|>|\theta_3(\Phi_N)-\theta_2(\Phi_N)+\theta_0(\Phi_N)|$,
  wherein $\Phi$ represents an angle formed between a light beam incident on the polarization separation element and a plane parallel to the second direction and including a normal line of an incidence position of the light beam in the polarization separation element,
  wherein $\theta_0(\Phi)$ represents an angle formed between the plane and a major axis direction of a polarized light of the light beam at the time of incidence of the light beam on the imaging optical element,
  wherein $\theta_1(\Phi)$ represents an angle formed between the plane and the major axis direction of the polarized light of the light beam at the time of incidence of the light beam on the polarization adjustment element, wherein $\theta_2(\Phi)$ represents an angle formed between the plane and the major axis direction of the polarized light of the light beam at the time of incidence of the light beam on the polarization separation element, wherein $\Phi_N$ represents an angle formed between the light beam incident on the polarization separation element and the plane, and corresponding to the maximum value of the difference between the angles $\theta_0(\Phi)$ and $\theta_1(\Phi)$, and wherein $\theta_3(\Phi)$ represents, when a linearly polarized light having the same wavelength as the wavelength of the light beam is incident on the polarization separation element at the angle $\Phi_N$, an angle formed between the plane and a polarization direction of the linearly polarized light corresponding to a maximum extinction ratio.

3. The optical scanning device according to claim 1, wherein at least one of the first light beam and the second light beam satisfies a relationship $|P_0(\Phi_M)-P_1(\Phi_M)|>|P_0(\Phi_M)-P_2(\Phi_M)|$, wherein $\Phi$ represents an angle formed between a light beam incident on the polarization separation element and a plane parallel to the second direction and including a normal line of an incidence position of the light beam in the polarization separation element, wherein $P_0(\Phi)$ represents a degree of polarization at the time of incidence of the light beam on the imaging optical element, wherein $P_1(\Phi)$ represents a degree of polarization at the time of incidence of the light beam on the polarization adjustment element, wherein $P_2(\Phi)$ represents a degree of polarization at the time of incidence of the light beam on the polarization separation element, and wherein $\Phi_M$ represents an angle formed between the light beam incident on the polarization separation element and the plane, and corresponding to the maximum value of the difference between the degrees of polarization $P_0(\Phi)$ and $P_1(\Phi)$.

4. The optical scanning device according to claim 1, wherein the polarization separation element includes a polarization separation surface formed by a dielectric multilayer film.

5. The optical scanning device according to claim 1, wherein at least one of the first light beam and the second light beam satisfies a relationship $|\theta_0(\Phi_N)-\theta_1(\Phi_N)|>|\theta_0(\Phi_N)-\theta_2(\Phi_N)|$, wherein $\Phi$ represents an angle formed between a light beam incident on the polarization separation element and a plane parallel to the second direction and including a normal line of an incidence position of the light beam in the polarization separation element, wherein $\theta_0(\Phi)$ represents an angle formed between the plane and a major axis direction of a polarized light of the light beam at the time of incidence of the light beam on the imaging optical element, wherein $\theta_1(\Phi)$ represents an angle formed between the plane and the major axis direction of the polarized light of the light beam at the time of incidence of the light beam on the polarization adjustment element, wherein $\theta_2(\Phi)$ represents an angle formed between the plane and the major axis direction of the polarized light of the light beam at the time of incidence of the light beam on the polarization separation element, and wherein $\Phi_N$ represents an angle formed between the light beam incident on the polarization separation element and the plane, and corresponding to the maximum value of the difference between the angles $\theta_0(\Phi)$ and $\theta_1(\Phi)$.

6. The optical scanning device according to claim 1, wherein the polarization separation element includes a polarization separation surface formed by a wire grid.

7. The optical scanning device according to claim 1, wherein the imaging optical element is made of resin.

8. The optical scanning device according to claim 1, wherein the polarization adjustment element includes a liquid crystal element including a nematic liquid crystal layer held between a pair of transparent plates via oriented films, and wherein at least one of the oriented films has an orientation direction changed in accordance with the angle of incidence of light.

9. The optical scanning device according to claim 1, wherein the polarization adjustment element and the polarization separation element form a single unit.

10. An image forming apparatus comprising:
a plurality of image carriers each configured to carry an image; and
an optical scanning device according to claim 1, configured to scan the plurality of image carriers with light.

* * * * *